United States Patent
Meynekhdrun

(10) Patent No.: US 6,366,669 B1
(45) Date of Patent: Apr. 2, 2002

(54) SYSTEM AND METHOD FOR PROVIDING UNIVERSAL ACCESS TO INTERACTIVE VOICE RESPONSE SYSTEMS

(76) Inventor: Iosif Meynekhdrun, 14 Seminole Ct., East Brunswick, NJ (US) 08816

( * ) Notice: Subject to any disclaimer, the term of this patent is extended or adjusted under 35 U.S.C. 154(b) by 0 days.

(21) Appl. No.: 09/558,389

(22) Filed: Apr. 26, 2000

(51) Int. Cl.$^7$ ................................................ H04M 1/00
(52) U.S. Cl. ...................... 379/359; 379/353; 379/361; 379/362; 379/286
(58) Field of Search ................................ 379/359, 362, 379/353, 88.01, 361, 352, 350, 251, 372, 377, 387.02, 355.01, 286

(56) References Cited

U.S. PATENT DOCUMENTS

| | | | |
|---|---|---|---|
| 4,066,846 A | | 1/1978 | Champan et al. ............ 379/351 |
| 4,119,810 A | | 10/1978 | Marin et al. .................. 379/40 |
| 4,215,246 A | | 7/1980 | Sawyer ................... 379/102.01 |
| 4,233,475 A | | 11/1980 | Roche ......................... 379/361 |
| 4,731,826 A | | 3/1988 | Daie .......................... 379/359 |
| 4,771,450 A | * | 9/1988 | Castro et al. ............... 379/386 |
| 4,868,873 A | | 9/1989 | Kamil ......................... 379/386 |
| 4,947,423 A | * | 8/1990 | Watanabe .................... 379/353 |
| 4,998,276 A | * | 3/1991 | Hasegawa ................... 379/361 |
| 5,241,591 A | * | 8/1993 | Saji ............................. 379/361 |
| 5,369,697 A | | 11/1994 | Murray et al. .............. 379/361 |
| 5,638,437 A | | 6/1997 | Bettan et al. ................ 379/353 |
| 6,185,286 B1 | * | 2/2001 | Shaffer et al. .............. 379/210 |

FOREIGN PATENT DOCUMENTS

| | | | | |
|---|---|---|---|---|
| JP | 61-187456 | | 8/1986 | ............ H04M/1/26 |
| JP | 63172543 A | * | 7/1988 | ............ H04M/1/26 |
| JP | 1068170 A2 | | 3/1989 | ........... H04M/11/00 |
| JP | 1173950 A2 | | 7/1989 | ............ H04M/1/26 |
| JP | 1248854 A2 | | 10/1989 | ............ H04M/1/26 |
| JP | 1256260 A2 | | 10/1989 | ............ H04M/7/00 |
| JP | 1261056 A2 | | 10/1989 | ............ H04M/1/26 |
| JP | 2021761 A2 | | 1/1990 | ........... H04M/1/274 |
| JP | 4211553 A2 | | 8/1992 | ............ H04M/1/26 |
| JP | 4326248 A2 | | 11/1992 | ............ H04N/1/32 |
| JP | 05167661 A | * | 7/1993 | ............ H04M/1/26 |
| JP | 7154463 A2 | | 6/1995 | ............ H04M/1/26 |
| JP | 9181812 A2 | | 7/1997 | ............ H04M/1/26 |
| WO | WO 94/10808 | | 5/1994 | ............ H04Q/1/50 |
| WO | 9712361 | | 4/1997 | ............ G10L/9/00 |

OTHER PUBLICATIONS

International Search Report (PCT/US01/12040) dated Sep. 14, 2001.

"Pulse to Tone Conversion" by John Jainschigg; Teleconnect Oct. 1996; pp. 92–96.

* cited by examiner

*Primary Examiner*—Fan Tsang
*Assistant Examiner*—Ovidio Escalante
(74) *Attorney, Agent, or Firm*—Zoltick Technology Law Group, PLLC

(57) ABSTRACT

A system and method for allowing callers using DP telephones to access IVR systems, including monitoring DP signals until a dialed digit is recognized, where the DP signals are generated by a transmission element and received by a reception element within a telephone network, and where the monitoring does not interfere with the DP signals, sending the dialed digit to a DTMF transmitter, and outputting a DTMF signal following the DP signals on a speech path, wherein the DTMF signal corresponds to the dialed digit.

26 Claims, 21 Drawing Sheets

| Digit Input | Dial Pulse Protocol | Dual Tone Multi Frequency Protocol | Combined Mode Signaling Protocol | |
|---|---|---|---|---|
| | DP pulses | DTMF Frequencies | DP pulses | DTMF Frequencies |
| 1 | 1 pulse | 1209Hz+697Hz | 1 pulse | 1209Hz+697Hz |
| 2 | 2 pulse | 1336Hz+697Hz | 2 pulse | 1336Hz+697Hz |
| 3 | 3 pulse | 1477Hz+697Hz | 3 pulse | 1477Hz+697Hz |
| 4 | 4 pulses | 1209Hz+770Hz | 4 pulses | 1209Hz+770Hz |
| 5 | 5 pulses | 1336Hz+770Hz | 5 pulses | 1336Hz+770Hz |
| 6 | 6 pulses | 1477Hz+770Hz | 6 pulses | 1477Hz+770Hz |
| 7 | 7 pulses | 1209Hz+852Hz | 7 pulses | 1209Hz+852Hz |
| 8 | 8 pulses | 1336Hz+852Hz | 8 pulses | 1336Hz+852Hz |
| 9 | 9 pulses | 1477Hz+852Hz | 9 pulses | 1477Hz+852Hz |
| 0 | 10 pulses | 1336Hz+941Hz | 10 pulses | 1336Hz+941Hz |
| * | - | 1209Hz+941Hz | 1209Hz+941Hz | |
| # | - | 1477Hz+941Hz | 1477Hz+941Hz | |

FIG. 20

| Class of CMS Devices | Type of CMS Device | Direction of the call | Presence of CMS signal during | |
|---|---|---|---|---|
| | | | Connection Phase | Interaction Phase |
| Caller-Side | Telephones with CMS capability | From caller to IVR | Yes | Yes |
| | | From IVR to caller | No | Yes |
| | Stand-Alone CMS Devices | From caller to IVR | Yes | Yes |
| | | From IVR to caller | No | Yes |
| CO-Side | CO-LL CMS Devices | From caller to IVR | Yes | Yes |
| | | From IVR to caller | No | Yes |
| | CO-SP CMS Devices | From caller to IVR | Depends on CO or PBX. Example: Step-by-step CO-Yes Cross-bar CO - No | Yes |
| | | From IVR to caller | Depends on CO or PBX. | Depends on CO or PBX. |
| | CO-TR CMS Devices | From caller to IVR | Depends on CO | Yes |
| | | From IVR to caller | N/A. Covered by CMS in main CO | |

SYSTEM AND METHOD FOR PROVIDING UNIVERSAL ACCESS TO INTERACTIVE VOICE RESPONSE SYSTEMS

BACKGROUND OF THE INVENTION

1. Field of the Invention

The present invention relates generally to telephonic communications, and more particularly to providing universal access to interactive voice response systems.

2. Related Art

Two types of telephone dialing are in use today worldwide: dial pulse ("DP") and dual-tone multi-frequency ("DTMF"). DP is a signaling standard developed in 1920s to operate automatic telephone switching equipment that requires pulses of electrical current to operate relay-type selector gear. DP pulses are created by breaking the current in the local loop a number of times corresponding to the digit being dialed. The term "DP telephone" is used herein to refer to telephones that can communicate using DP signaling. DP telephones can include, for example, rotary telephones and pushbutton telephones having a keypad. The round dial of the rotary telephone is rotated counterclockwise to the desired digit and released causing a small cam to break the loop the correct number of times. For pushbutton telephones, pulses are created electronically after the desired digit is pressed on the keypad.

The DTMF dialing mode was developed by Bell Laboratories and introduced in the United States in mid-1960s as an alternative to DP. Each of 16 possible DTMF signals is represented by a unique pair of frequencies.

A majority of land line telephones in use today worldwide (60 to 70% by some estimates) cannot dial in DTMF. This is mostly because older type central offices (e.g., step-by-step and crossbar type central offices) within telephone networks do not recognize DTMF signaling in the local loop. DP remains the most common signaling in these countries. Telephone users may also choose to retain DP service when it is less expensive than DTMF service.

Unfortunately, this vast segment of the worldwide telephone market is unable to access the many and varied interactive voice response (IVR) systems, enhanced services, and other call processing applications that have become prevalent in many countries. The majority of these systems are designed to receive only DTMF signals from callers.

As a result, businesses and residential users are unable to access many efficiency-enhancing IVR applications such as, for example, voice mail, auto-attendant, information bureaus, automated ordering systems, and telebanking. Telephone companies cannot offer any enhanced high-margin caller services, effectively limiting them to two main sources of revenue: installation/activation fees and monthly charges forbasic telephone service. Local telephone companies are also losing money because of the low call completion rate associated with DP service, because only those calls which are successfully connected and followed by conversation are chargeable and thus profit generating. Long distance providers cannot implement widespread pre-paid calling card systems which rely on DTMF signaling. This drastically reduces competition in many countries, driving up rates for long distance and international calls.

Furthermore, travelers overseas experience difficulties accessing their IVR systems at home when visiting countries where DP prevails. Paging companies are limited to using more expensive alphanumeric pagers to provide worldwide coverage, which requires that they also support expensive call centers having numerous operators for receiving requests and manually paging their customers.

A number of different systems have been developed in order to overcome the so-called DTMF barrier. These systems can be grouped into two main categories: systems implemented on the IVR side, and systems implemented on the caller side.

Dial pulse recognition systems are a first IVR-side example. Telephone networks normally do not pass through to the IVR system the actual electrical DP pulses from DP telephones. Rather, the IVR system at best receives audible clicks corresponding to the DP pulses. Two different dial pulse recognition systems have been implemented: pulse detection and pulse-to-DTMF conversion. Both are based on detecting and counting the audible clicks received by the IVR system. Pulse detection systems are implemented on the voice boards installed inside the computers that support the IVR system. Special software detects the incoming audible clicks and passes the results to the IVR application. For example, Dialogic Corporation has implemented pulse detection within their products. Pulse-to-DTMF conversion systems detect the incoming audible clicks and generate an equivalent DTMF signal which is then used by the IVR system. These systems are often implemented as separate equipment, such as personal computer (PC) boards or a separate stand-alone system. For example, Teleliaison, Aerotel Corporation, and Sumihiro Signal Processing have implemented pulse-to-DTMF conversion systems.

However, dial pulse recognition systems suffer from several disadvantages. First, these systems have not proven to be reliably accurate. Both require accurate detection of the audible clicks associated with DP signals, the accuracy of which depends on, for example, the type of central office equipment, noise in the speech path, and the network configuration. Some networks completely filter out the audible clicks, rendering IVR-side dial pulse recognition systems completely useless. Furthermore, these systems are very expensive (e.g., from $200 to $700 per port). The cost of adding dial pulse recognition can often double the overall cost of an IVR system. These costs are passed along to subscribers in the form of higher rates.

Speech recognition systems are a second IVR-side example. Speech recognition technology allows callers to interact with IVR systems through spoken phrases. The IVR system is equipped with special hardware and/or software that is designed to understand certain voice commands. Speech recognition systems can vary, for example, by the number of words in their vocabulary, by the number of languages supported, and by the sophistication of their speech recognition algorithm. However, speech recognition technology is very expensive (e.g., $1,000+per port), often more than doubling overall system cost. Reliability is also low, given that the accuracy of speech recognition can depend upon, for example, the caller's speaking habits (e.g., accents, voice levels, changes in voice due to sickness), and the network quality (e.g., noise levels).

Different caller-side systems have also be implemented. Portable DTMF tone generators are a first caller-side example system that allow users to access IVR systems using any DP telephone. The user places a call and waits for the IVR system to answer. Once the IVR answers, the user places the generator against the microphone of the handset while keeping the earpiece against her ear, and presses the appropriate buttons on the generator's keypad in response to the IVR spoken instructions. The device generates the appropriate audible DTMF signals which are picked up by the microphone and sent to the IVR system.

However, these portable generators are inconvenient to use. Users must purchase and carry these devices in order to access their IVR services. They also require special training and a level of manual dexterity that significant portions of the population may not possess, such as older users and persons with physical disabilities. For example, in order to achieve reliable results, the user must hold the device properly against the handset and press the correct buttons on what is often a small keypad. Furthermore, these battery-operated devices are usually good for about 2000 calls before the batteries must be changed, leaving open the possibility that the device may "die" at a crucial moment. These devices can be easily damaged, lost or stolen, and are relatively expensive (approximately $20), particularly taking into consideration salary levels in many developing countries (e.g., $100 per month or less).

Telephones capable of switching between dialing modes are a second example of caller-side systems. Some of these telephones can be manually switched between DP and DTMF modes, for example, by pushing a designated button on the telephone's keypad (e.g.,"*"). The caller places the call in DP mode, and then switches to DTMF once the IVR system answers. An example of this type telephone can be found in U.S. Pat. No. 4,731,826 to Daie. However, the caller must purchase a dual-mode phone and must remember to switch modes when accessing IVR services.

Other dual-mode telephones include hardware that recognizes when a call has been connected and switches automatically from DP to DTMF, examples of which can be found in U.S. Pat. No. 5,638,437 to Bettan et al. ("Bettan"), and U.S. Pat. No. 5,369,697 to Murray et al. ("Murray"). These automatic telephones must use some criteria for switching dialing modes. Bettan, for example, switches dialing modes upon detecting a ring back signal. Performance can degrade whenever, as is often the case, generation of ring back signals and ring signals is not synchronized. This frequently occurs where IVR systems are installed behind a private branch exchange (PBX). Here, the IVR might answer the call before the telephone receives the ring back signal. Automatic dual-mode telephones also will not work with IVR applications that require outbound dialing (e.g., message notification).

Still other telephones, such as those described in U.S. Pat. No. 4,119,810 to Marin et al., include a telephone apparatus with automatic dialing and sequential control signaling capabilities. These telephones can support sequential dialing in DP and DTMF under user control, or automatically in a preprogrammed mode. However, in manual mode, the user must still remember to switch from one mode to the next, and the automatic mode is not appropriate for interacting with an IVR system because the callers response will vary according to particular menu options.

Of course, for those areas in which DTMF signaling is already supported by the local telephone company, users must only replace their old DP telephone with a DTMF capable telephone in order to access IVR services. However, the cost of a new telephone, though minimal, can be significant when compared to the average income in many developing countries. Users may also decide to stay with DP service because they do not want to pay extra fees for DTMF service. Sometimes, users are not even aware that DTMF service exists and what it is all about.

For those areas in which DTMF signaling is not yet supported, upgrading the telephone network to accommodate DTMF can be very expensive, and in some cases, may not be possible short of wholesale replacement of the network. The cost of system upgrades can, for example, range from $5 to $10 per subscriber for hardware only, with significant additional labor costs for research, testing and implementation.

Many current systems also do not support outbound dialing features. Outbound dialing refers to those features wherein the IVR system initiates a call to a user. For example, an IVR system that provides voice mail can call to notify a subscriber that a new voice message has been received. However, the majority of IVR-side systems start working only after receiving an incoming ling. During an outbound call from IVR system to subscriber, there will be no incoming ring signal into the IVR system and as a result the IVR-side system will be disabled. On the other hand, existing caller-side systems depend on receiving some control signal, for example ring back, to switch from DP to DMTF mode. But these signals are not received by the caller-side system when the IVR system calls the subscriber.

A need therefore exists for a low-cost, reliable system and method for allowing callers using DP telephone service to access IVR systems.

SUMMARY OF THE INVENTION

Briefly stated, the present invention is directed to providing universal access to interactive voice response systems from any DP telephone by using combined mode signaling devices that are strategically positioned in the telephone network to monitor DP signals. According to the present invention, combined mode signaling devices generate DTMF digits following every recognized DP digit, without interfering with the DP signal that is being monitored.

A first example embodiment of the present invention is directed to a system and method for allowing callers using DP telephones to access IVR systems, including monitoring DP signals on a line until a dialed digit is recognized, where the DP signals are generated by a transmission element and received by a reception element within a telephone network, and where the monitoring does not interfere with the DP signals, sending the dialed digit to a DTMF transmitter, and outputting a DTMF signal following the DP signals on the line, wherein the DTMF signal corresponds to the dialed digit.

A second example embodiment of the present invention is directed to a telephone that includes a keypad having keys corresponding to digits "1" through "9", "#", and "*", a switch having a first position, a second position, and a third position, and a DP transmitter to output on a local loop a DP signal responsive to one of the keys corresponding to digits "1" through "9" when the switch is in the first position and a DTMF transmitter to output on the local loop a DTMF signal responsive to the keys corresponding to digits "1" through "9", "#", and "*" when the switch is in the second position, and wherein the DP transmitter and the DTMF transmitter operate in coordination to output on the local loop a combined mode signaling sequence when the switch is in the third position, wherein the combined mode signaling sequence includes a DP signal followed by a DTMF signal responsive to the keys corresponding to digits "1" through "9", and wherein the combined mode signaling sequence includes a DTMF signal responsive to the keys corresponding to symbols "#" and "*".

A third example embodiment of the present invention is directed to a telephone that includes a keypad having keys corresponding to digits "1" through "9", "#", and "*", a switch having a first position and a second position, a DP transmitter, and a DTMF transmitter, wherein the DP transmitter outputs on a local loop a DP signal responsive to one of the keys corresponding to digits "1" through "9" and the DTMF transmitter outputs on the local loop a DTMF signal responsive to the keys corresponding to digits "#" and "*" when the switch is in the first position, and wherein the DTMF transmitter outputs on the local loop a DTMF signal responsive to the keys corresponding to digits "1" through "9", "#", and "*" when the switch is in the second position.

A fourth example embodiment of the present invention is directed to a system that includes a telephone network, a telephone network interface box coupled to the telephone network via a local loop, a telephone jack coupled to the telephone network interface box, a telephone coupled to the telephone jack, and a combined mode signaling device, coupled to the telephone jack, having a control device coupled to monitor DP pulses from the telephone without interfering with the DP pulses, a dial pulse counter to count the DP pulses until a dialed digit is recognized, and a DTMF transmitter to output a DTMF signal on the local loop, wherein the DTMF signal corresponds to the dialed digit.

A fifth example embodiment of the present invention is directed to a system that includes a telephone network, a telephone network interface box coupled to the telephone network via a local loop, a telephone jack coupled to the telephone network interface box, a telephone coupled to the telephone jack, and a combined mode signaling device, coupled between the telephone jack and the telephone network interface box, having a control device coupled to monitor DP pulses from the telephone without interfering with the DP pulses, a dial pulse counter to count the DP pulses until a dialed digit is recognized, and a DTMF transmitter to output a DTMF signal on the local loop, wherein the DTMF signal corresponds to the dialed digit.

A sixth example embodiment of the present invention is directed to an apparatus for allowing a caller using a DP telephone to access an IVR system connected to a central office within a telephone network, wherein the DP telephone is coupled to the telephone network via a local loop, and wherein the central office includes a speech path, a main distribution frame coupled to the speech path, a subscriber interface unit coupled to the speech path, a subscriber switching unit coupled to the speech path, an intermediate distribution frame coupled to the speech path, and a speech path interface unit coupled to the speech path, wherein the apparatus includes a control device coupled to monitor DP pulses from the DP telephone without interfering with the DP pulses, a dial pulse counter to count the DP pulses until a dialed digit is recognized, and a DTMF transmitter to output a DTMF signal on the speech path, wherein the DTMF signal corresponds to the dialed digit. The control device can, for example, be coupled to the speech path between the main distribution frame and the subscriber interface unit, or between the intermediate distribution frame and the speech path interface unit.

A seventh example embodiment of the present invention is directed to an apparatus for allowing a caller using a DP telephone to access an IVR system via a telephone network, wherein the telephone network includes a remote switch (e.g., a remote central office or PBX) coupled to the DP telephone via a local loop and a main switch (e.g., a main central office) coupled to the IVR system, and wherein the main switch is coupled to the remote switch via a trunk line, wherein the apparatus includes a control device coupled to the trunk line to monitor DP pulses, a dial pulse counter to count the DP pulses until a dialed digit is recognized, and a DTMF transmitter to output a DTMF signal on the trunk line, wherein the DTMF signal corresponds to the dialed digit.

These example embodiments can be implemented according to the present invention as devices that are relatively simple, inexpensive, and reliable. Combined mode signaling devices according to the present invention require minimal functionality and operate without having to monitor line signals such as ring back, answer supervision and others, nor do they have to switch between DP and DTMF modes. As a result, combined mode signaling devices are relatively inexpensive to implement, install and maintain. Further, the performance of combined mode signaling devices does not depend on the telephone network, because device operation is not based in any way on the network signals. For example, for combined mode signaling IVR-side devices, operation does not depend upon signals that the network passes from the caller to the IVR system, such as audible clicks. Alternatively, for combined mode signaling caller-side devices, operation does not depend upon signals that the network sends to the caller, such as a ring back signal. Combined mode signaling devices need only monitor DP signals. This requires a minimum number of functions and makes these devices the simplest and cheapest possible solution to overcome DTMF barrier.

Combined mode signaling devices can be used where only DP service is available in the local loop, where only DTMF services are available in the local loop, and where both DP and DTMF service is available but the subscriber's interface at the central office is programmed for DP service only. The devices can be used by both business and residential subscribers that use DP telephones that are connected directly to a central office via a local loop, or connected to older type non-electronic switches (e.g., PBX, crossbar).

According to the present invention, the reliability of DP pulse recognition is increased by monitoring electrical DP signals rather than monitoring audible clicks. DP pulse recognition is achieved without interfering with the DP pulses produced by the user's telephone.

An advantage of the present invention is that millions of callers worldwide using DP telephones can be provided with access to IVR systems. Telephone companies can offer to subscribers as a new chargeable service the capability of accessing IVR systems. High-margin IVR services can then be offered to these callers, whether by the telephone company or an independent IVR provider, thereby providing a highly profitable revenue stream. The present invention also provides for higher call completion rates within the telephone network, which further increases telephone company profits.

Another advantage of the present invention is that both subscribers and/or telephone companies can implement the present invention in order to gain or provide access to IVR systems. Subscribers can use caller-side combined mode signaling devices if their local telephone company refuses to implement combined mode signaling in the central office. Conversely, telephone companies can implement central office based combined mode signaling devices and then offer new services to subscribers. In all cases, IVR systems can be widely implemented across the world, regardless of whether DTMF service is available.

Another advantage of the present invention is that access to IVR systems is automatic from the perspective of the caller. The caller is not required to switch dialing modes during a telephone call, or to activate any device other than the telephone.

Another advantage of the present invention is that travelers visiting countries that provide DP service are able to access their home IVR systems using an inexpensive, portable device that plugs into the telephone jack.

Another advantage of the present invention is that access to IVR systems can be achieved without requiring that the caller purchase a new telephone.

Another advantage of the present invention is that outbound dialing is supported because combined mode signaling devices according to example embodiments of the present invention can operate continuously, regardless of whether the user or the IVR system initiates the call.

Another advantage is that those who provide IVR services to DP telephones are relieved of the responsibility of purchasing and maintaining expensive equipment for dial pulse or speech recognition. This significantly reduces the cost of implementing and operating IVR systems. It also opens the worldwide market to all computer telephony system manufacturers, which can now sell their systems in standard packages without any special dial pulse or speech recognition solution. Companies desiring to install an IVR system oftentimes are required to undergo an expensive and time consuming process of certification and approval of their systems by a local regulatory agency. Those systems that are directly connected to the local telephone network, such as pulse-to-tone converters and other IVR-side systems, are often the subject of heavy regulation. As a result of these barriers to entry, companies often canceled their attempts to penetrate into the market of many developing countries. However, because pulse-to-tone converters and other IVR-side systems are no longer necessary according to the present invention, these barriers to entry can be circumvented. IVR providers can now connect to the local telephone network using standard voice boards, such as those produced by Dialogic Corporation, that have already been approved by regulatory agencies in most countries throughout the world.

Another advantage of the present invention is that local telephone companies can insure that all of their subscribers have access to IVR systems from any DP telephone, as well as from older type PBX systems. As a result, telephone companies and other call center operators that currently employ thousands of agents to handle calls from DP telephone users can achieve significant savings. These calls can now be handled with an IVR system rather than a live agent, because even those subscribers using DP telephones now have access to IVR systems using the present invention.

Those embodiments of the present invention that are connected within the central office have many advantages. For example, each combined mode signaling device can be used to provide service to multiple subscribers, sometimes as many as ten subscribers per device and more, depending on the particular central office configuration. This reduces the cost of providing combined mode signaling for any central office by an order of magnitude or more. Installation and maintenance within the central office is also much simpler and less expensive than implementation at the caller's location. And many of these devices can be implemented on a single board, further reducing per-unit costs.

An advantage of the telephone embodiments is that those callers using DP telephones with a keypad that includes the "#" and "*" keys are able to interact with IVR systems that use these keys in their menus. Prior DP recognition systems attempt to recognize other key combinations (e.g., the same digit dialed twice in rapid succession) as substitutes for "#" and "*". These prior solutions can be unreliable and confusing for the callers. Oftentimes IVR system developers must design an option to replace "#" and "*" with any other digit "1" through "9". This requirement can cause difficulties for IVR developers, and limits the number of options that can be provided to the user. According to certain embodiments of the present invention, when callers press the "#" and "*" keys, the corresponding signals will be sent out in DTMF which is recognizable by IVR systems, even when the telephone is in a DP mode.

Further features and advantages of the invention, as well as the structure and operation of various embodiments of the invention, are described in detail below with reference to the accompanying drawings.

BRIEF DESCRIPTION OF THE FIGURES

The present invention will be described with reference to the accompanying drawings. In the drawings, like reference numbers generally indicate identical, functionally similar, and/or structurally similar elements. The drawing in which an element first appears is indicated by the leftmost digit(s) in the corresponding reference number.

FIG. 20 depicts a chart that compares combined mode signaling to DP and DTMF signaling; and FIG. 21 depicts a table that compares whether the CMS signal is generated within the connection and/or interaction phases for caller-side and CO-side CMS devices.

DETAILED DESCRIPTION OF THE PREFERRED EMBODIMENTS

Overview of the Environment

Figure 1:
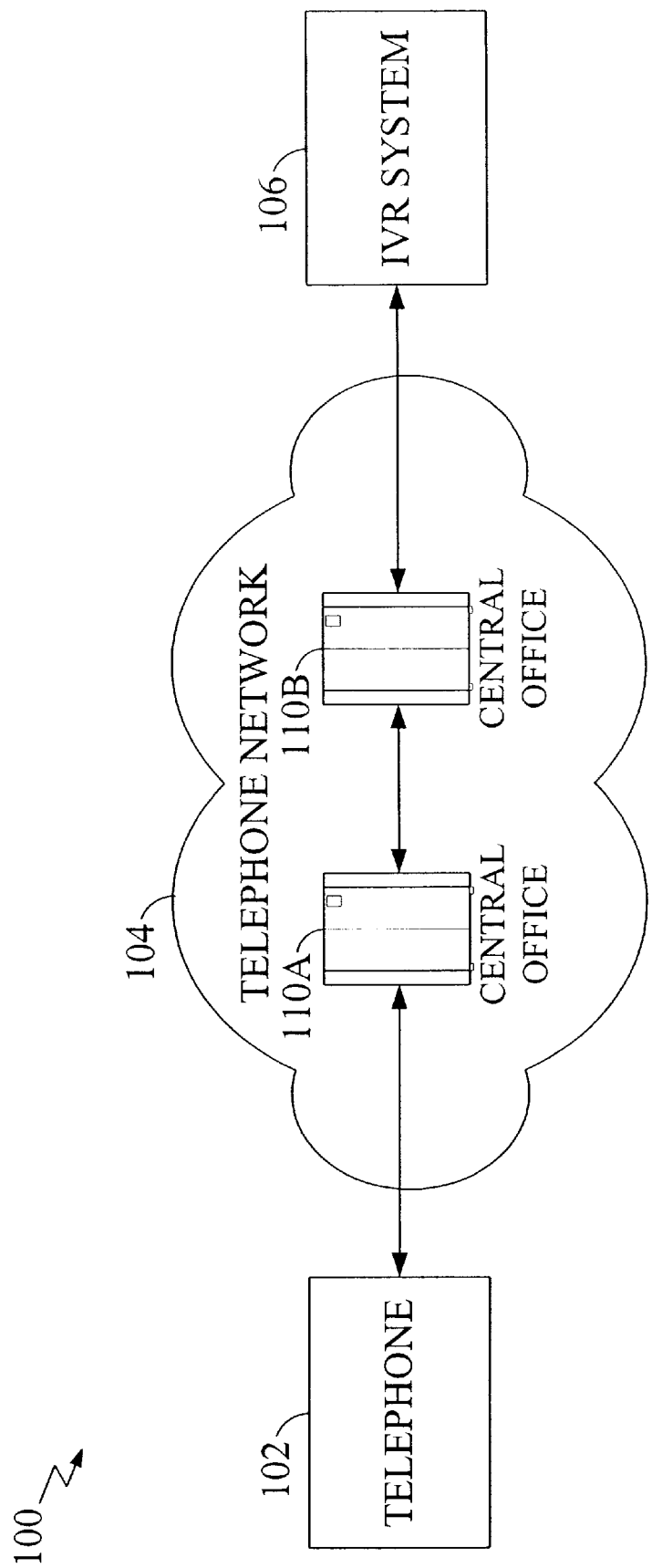
FIG. 1 depicts a telephony environment within which the present invention is used.

The present invention is directed to a system and method for allowing callers using DP telephones to access IVR systems. FIG. 1 depicts an example telephony environment 100 within which the present invention operates. A telephone 102 is connected to a telephone network 104. Telephone network 104 includes one or more central offices 110 (shown in FIG. 1 as 110A and 110B). Telephone 102 can be used to call other telephones, or other telephony devices such as an IVR system 106.

Telephone 102 can represent any telephone device that is capable of communicating using DP signaling. Telephone 102 may or may not be capable of communicating using DTMF signaling as well. Telephone 102 can include any input mechanism (not shown) for entering calling digits, such as a rotary dial or a pushbutton keypad.

Telephone network 104 can represent any telephone network that is capable of handling communications between telephone 102 and IVR system 106. For example, telephone network 104 can represent a public switched telephone network (PSTN). Telephone networks 104 vary widely across regional and national boundaries. For example, those telephone networks 104 used in developed countries can be far more sophisticated and reliable than those in less developed countries.

As described above, telephone 102 and telephone network 104 can communicate with one another using DP signaling, DTMF signaling, or both. In general, DTMF signaling can only be used if telephone 102 and telephone network 104 both have DTMF capabilities. However, there are many circumstances where DTMF cannot be used. For example, DTMF signaling cannot be used if telephone 102 represents a DP telephone, or where telephone 102 has DTMF capabilities but central office 110A does not, or where both telephone 102 and central office 110A have DTMF capabilities, but for one reason or another, the telephone user (not shown) does not dial in DTMF. For example, users may not realize that their lines are DTMF capable, or they may choose the lower cost DP service where the telephone company charges a premium for DTMF service.

Figure 2:
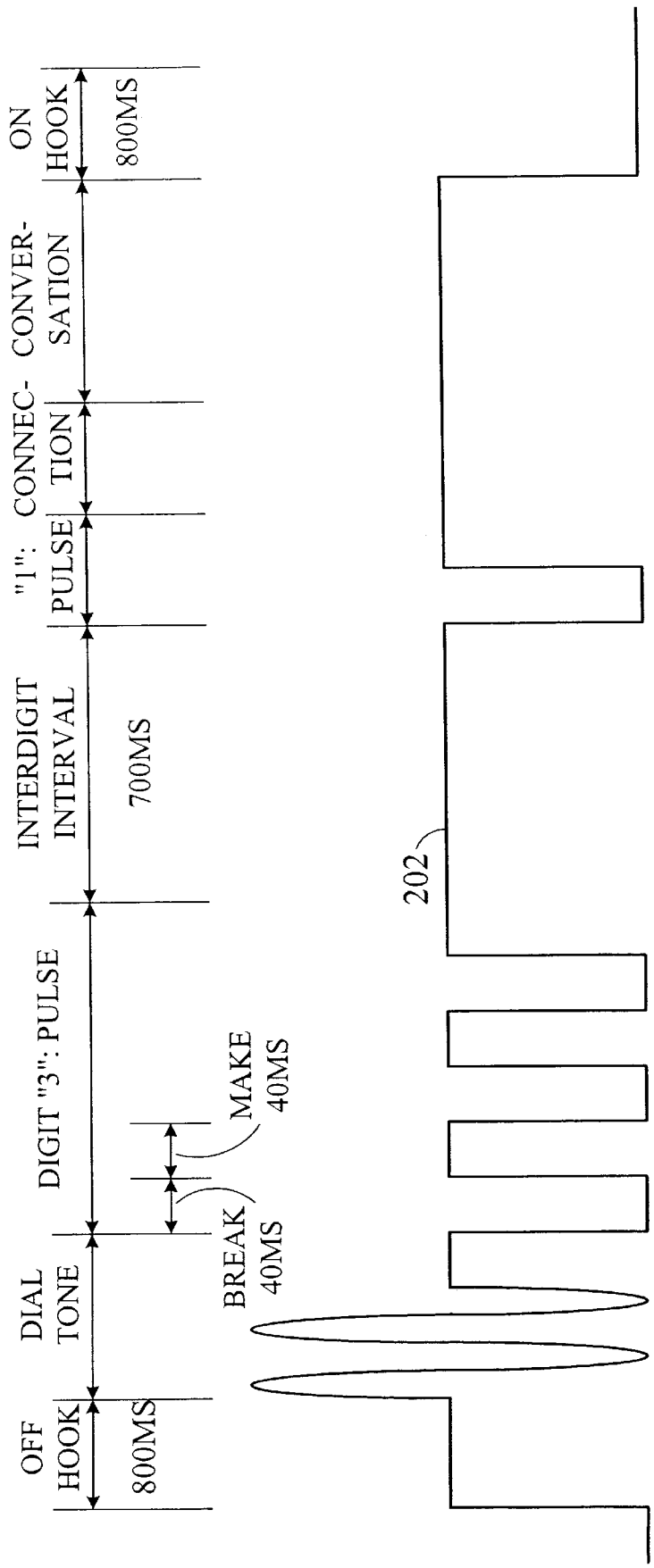
FIG. 2 depicts an example call connection using DP signaling.

FIG. 2 depicts an example call connection 202 using DP signaling. Call connection 202 begins with the caller lifting the handset of telephone 102, causing telephone 102 to go "off hook" for a period of at least 800 milliseconds (ms). The caller then receives a dial tone from telephone network 104 and begins dialing the desired telephone number.

Telephone 102 transmits a number of DP pulses equal to the dialed digit. DP pulses are specified at a normal speed of 10 pulses per second (but ranging from 8 to 12 pulses per second), with a minimum 700 ms interval between successive pulse trains (shown as inter-digit interval). In some networks, a higher speed of 20 pulses per second is used. FIG. 2 depicts an example shortened telephone number including the dialed digits "3" followed by "1" separated by the 700 ms inter-digit interval.

Figure 3:
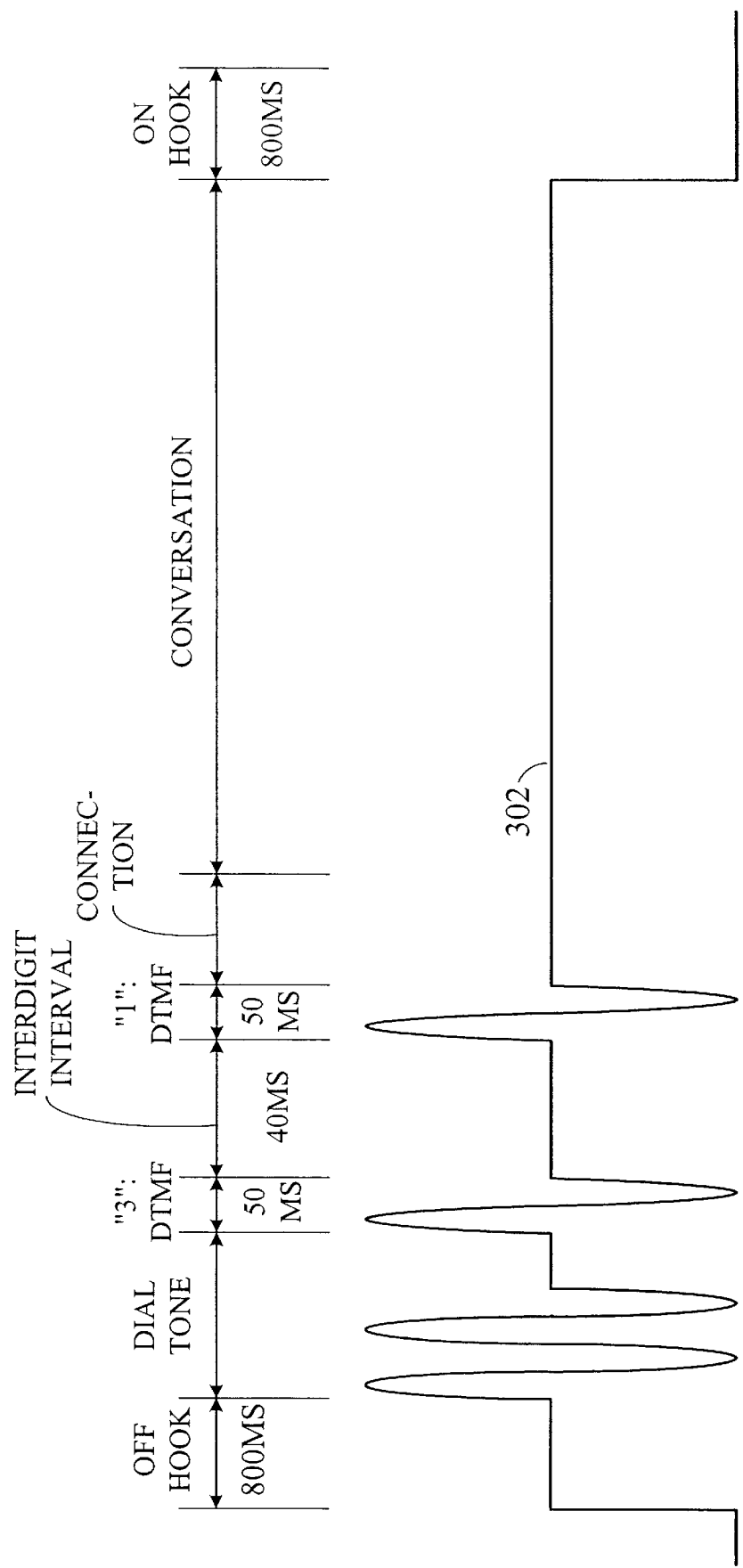
FIG. 3 depicts an example call connection using DTMF signaling.

FIG. 3 depicts an example call connection 302 using DTMF signaling. Call connection 302 also begins with the caller lifting the handset of telephone 102, causing telephone 102 to go off hook for a period of at least 800 ms. The caller then receives a dial tone from telephone network 104 and begins dialing the desired telephone number. As described above, each of the 16 possible DTMF signals is represented by a unique pair of frequencies, one from a high-frequency group (1209 Hz, 1336 Hz, 1477 Hz, and 1633 Hz) and one from a low-frequency group (697 Hz, 770 Hz, 852 Hz, and 941 Hz). For example, the digits "0" through "9", "*", and "#" are each represented by a unique pair of frequencies. The four frequency pairs that include 1633 Hz from the high-frequency group are reserved for special non-dialing functions, and are therefore not normally used by telephones. Typical DTMF signals are 50 ms in duration with an inter-digit interval of at least 40 ms. FIG. 3 also depicts example shortened telephone number "3" followed by "1" The composite tone signals corresponding to successive dialed digits are separated by an inter-digit interval of 40 ms.

DTMF signaling is therefore quicker than DP signaling. For example, sending a "0" using DP signaling can take almost 2 seconds, compared to less than 100 ms for DTMF signaling.

For both DP and DTMF cases, once the telephone number has been dialed and telephone network 104 establishes a connection link between two parties, the called party answers by going off hook, thereby establishing a speech path. The period of time between telephone 102 going off hook and the speech path being established is referred to herein as the "connection phase". For the example environment depicted in FIG. 1, IVR system 106 receives ringing signals from telephone network 104, goes off hook and answers the caller by playing the first opening greeting.

The caller interacts with IVR system 106 by inputting digits. For example, IVR system 106 can prompt the caller by oral instructions which can be divided into one or more menus and sub-menus. This phase is referred to herein as the "interaction phase". IVR systems are typically designed to respond only to DTMF signaling. Telephones 102 communicating with DP signaling are therefore unable to interact with IVR system 106 during the interaction phase. According to the present invention, DTMF signals are generated corresponding to the dialed DP signals so that the caller may interact with IVR system 106.

Combined Mode Signaling

To allow callers using DP telephones to access IVR systems a combined mode signaling protocol is used according to the present invention. With combined mode signaling, each digit generated by the caller (or by central office equipment) in DP mode is followed by its DTMF equivalent during the inter-digit interval. This signaling mode is referred to herein as combined mode signaling (CMS) because it combines both DP and DTMF signaling modes.

FIG. 20 depicts a chart that compares combined mode signaling to DP and DTMF signaling. Column 2002 shows the digit dialed by the user. Column 2004 lists the number of DP pulses that are created for each dialed digit. For example, if the user dials a "3", then three DP pulses are generated using the DP protocol. Column 2006 lists the two frequencies generated for each dialed digit according to the DTMF protocol. For example, if the user dials a "3", then signals having frequencies of 1477 Hz and 697 Hz are generated according to the DTMF protocol. Column 2008 lists the DP signals and DTMF signal that are generated according to the combined mode signaling protocol of the present invention. For example, if the user dials a "3", then three DP pulses are generated followed by signals having frequencies of 1477 Hz and 697 Hz according to the combined mode signaling protocol.

For inputs "*" and "#", there is no corresponding DP signal within the DP protocol (noted by "–" within FIG. 20). According to the combined mode signaling protocol, only the DTMF signals are generated for inputs "*" and "#". This will be described in greater detail below in conjunction with telephone embodiments according to the present invention having combined mode signaling capability.

Figure 4:
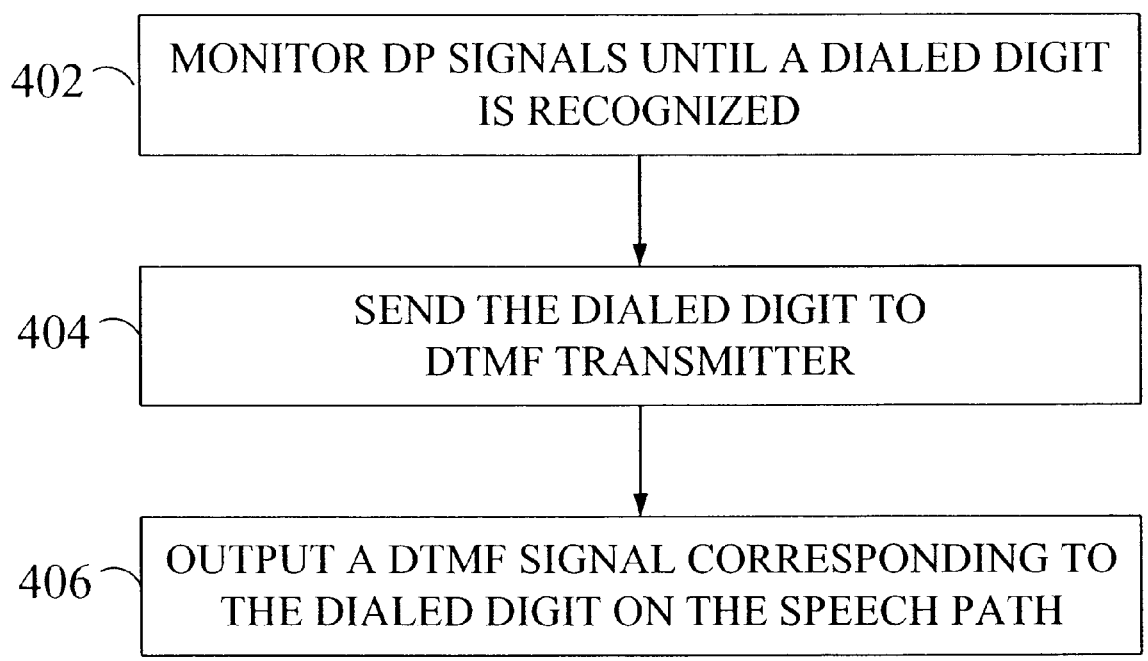
FIG. 4 is a flowchart that describes an example method according to the present invention for generating DTMF signals based on DP signaling, thereby creating a combined mode signaling signal.
Figure 5:
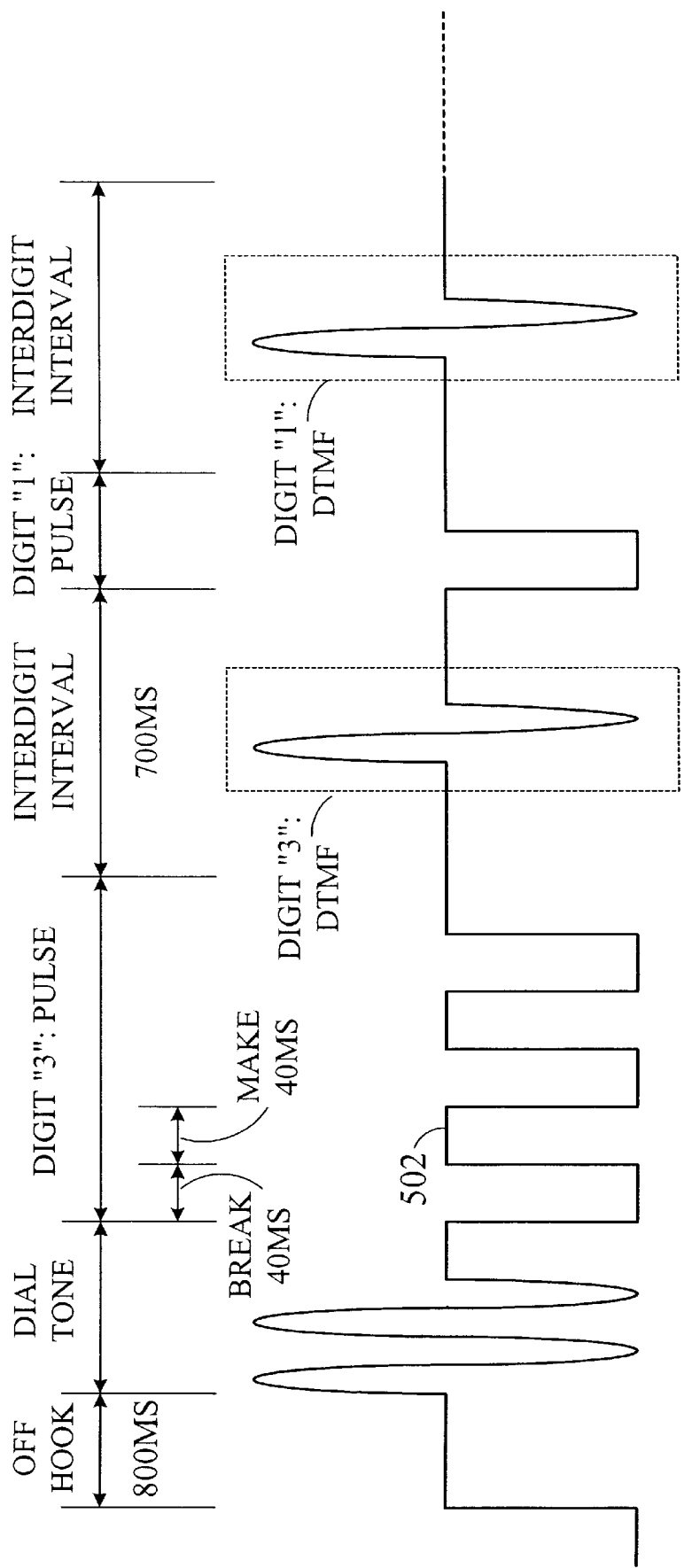
FIG. 5 depicts an example combined mode signaling signal.

FIG. 4 is a flowchart that describes an example method for generating combined mode signaling signals. FIG. 5 depicts an example CMS signal 502. Many different devices are described below for implementing CMS according to the present invention.

In step 402, the CMS device monitors DP signals until a dialed DP digit is recognized. For example, the CMS device may count the monitored DP pulses until the inter-digital interval is reached, indicating that the digit associated with the current pulse train is complete. The CMS device is passive in nature in that it waits for dialed DP digits by monitoring the DP signals. As shown in FIG. 5, the three DP pulses are monitored, and it is recognized that three DP pulse train corresponds to the dialed digit "3" once the inter-digit interval is reached. Similarly, the single DP pulse is monitored, and it is recognized that the single DP pulse corresponds to the dialed digit "1" once the inter-digit interval is reached.

The DP signals can be generated by a transmission element and received by a reception element within the telephone network. For example, where the transmission element is telephone 102 and the reception element is central office 110A, the CMS device monitors the real electrical DP signals (as opposed to, for example, the audible clicks heard by a called party corresponding to DP signals received by the central office) generated by telephone 102 on part of the line connecting telephone 102 and central office 110A. As another example, the transmission element can represent a first switch, such as central office 110A, and the reception element can represent a second switch, such as central office 110B. In this second example, the CMS device monitors the real electrical DP signals on the line connecting the two switches.

Further, the CMS device monitors the DP signals generated by the transmission element without interfering with the DP signals. For example, the CMS device can be connected to the line in parallel so that the electrical characteristics of the DP signals are not altered to any significant degree. The manner in which the CMS device is connected to the telephone line to allow for the monitoring of DP signals can vary from one embodiment to the next. Many example embodiments are described in detail below.

In step 404, the recognized digit is sent to a DTMF transmitter. For those CMS embodiments where different hardware is used to monitor the DP signals and to transmit corresponding DTMF signals, this step can represent sending the recognized digit along a communications path between the two hardware units. Alternatively, for those CMS embodiments where one or both functions of monitoring DP signals and transmitting DTMF signals are implemented as one or more software modules, this step can represent passing the recognized digit between two software modules, passing the recognized digit as a variable within the same software module, or passing the recognized digit between a software module and a hardware interface.

In step 406, a DTMF signal corresponding to the recognized dialed digit is output on the speech path. As shown in FIG. 5, a DTMF signal corresponding to the recognized dialed digit "3" is output on the speech path after the DP pulse train (sinusoidal signals representing DTMF signals in FIG. 5 are used for illustrative purposes only; actual DTMF signals are the combination of two sinusoidal signals having different frequencies). Similarly, a DTMF signal corresponding to the recognized dialed digit "1" is output on the speech path after the single DP pulse.

According to an example embodiment of the present invention, the DTMF signal is output on the speech path during the inter-digit interval following the corresponding DP pulse train, as shown in FIG. 5. According to a second example embodiment, the DTMF signals can be output at other times during the CMS signal, so long as the DTMF signals do not interfere with the DP signals and so long as the DTMF signals are transmitted in the same order as their corresponding recognized DP digits.

Generating CMS signals can allow a caller using a DP telephone 102 to interact with IVR system 106. During the connection phase, central office 110A receives each digit in both DP and DTMF modes. Central office 110A uses the DP signaling to route the call to IVR system 106, and ignores the DTMF signaling. For example, this can occur where central office 110A is unable to recognize DTMF signaling, or is programmed to only recognize DP signals such as where the subscriber chooses the less expensive DP service. During the interaction phase, central office 110A passes the DTMF signals through to IVR system 106 on the speech path, but in many cases does not pass through the DP signals. IVR system 106 receives and responds to the DTMF signals and ignores the DP signals, even if the DP signals are passed through.

According to the present invention, the different modes of the CMS signal are used selectively. Central office 110 uses the DP version of each digit during the connection phase to establish the connection between telephone 102 and IVR system 106, whereas IVR system 106 uses the DTMF version of each digit to control the IVR application. Callers using DP telephones 102 that communicate with central office 110 using DP signals are therefore able to interact with any IVR system 106. Further, it is no longer necessary to switch between dialing modes, whether automatically or under user control, because every dialed digit in the CMS signal is represented by both DP and DTMF versions.

CMS signaling as described in FIG. 4 can be used to allow telephone 102 to communicate with IVR system 106 for most telephone networks 104 in use worldwide today. For example, CMS signaling can be used where only DP service is available in the local loop, where only DTMF service is available in the local loop, where both DP and DTMF services are available but the subscriber interface at central office 110A is programmed to recognize only DP signaling.

Additional steps can be taken where the subscriber's interface at central office 110A is programmed to recognize both DP and DTMF, but the caller is still dialing in pulse. This can occur, for example, where DTMF service is offered free of charge, but subscribers are either not aware of the DTMF service, don't understand the service, or choose to ignore the service. These subscribers can access IVR system 106 by either obtaining a new telephone 102 with DTMF capability or, if their existing telephones allow, start using the telephones in DTMF mode. Those subscribers who prefer to use their old rotary telephones (e.g., subscriber does not want to spend money on a new telephone) and still have access to IVR systems should request that their DTMF service be canceled within telephone network 104.

Combined Mode Signaling Devices

According to the present invention, the CMS device can be implemented in many different ways. The design of the CMS device can vary, for example, according to where the CMS device is located within the system (e.g., within telephone 102, within the caller's home, within central office 110), according to the signaling used by telephone network 104 at the point of connection. For example, CMS devices can be connected to the caller's local loop, either at the caller's location or at the central office, or to the trunk interface. CMS devices can vary in the number of connecting wires (e.g., 2 or more), the type of connection (e.g., parallel or serial), and in bow the "connect", "disconnect" and DP signals are detected.

Figure 6:
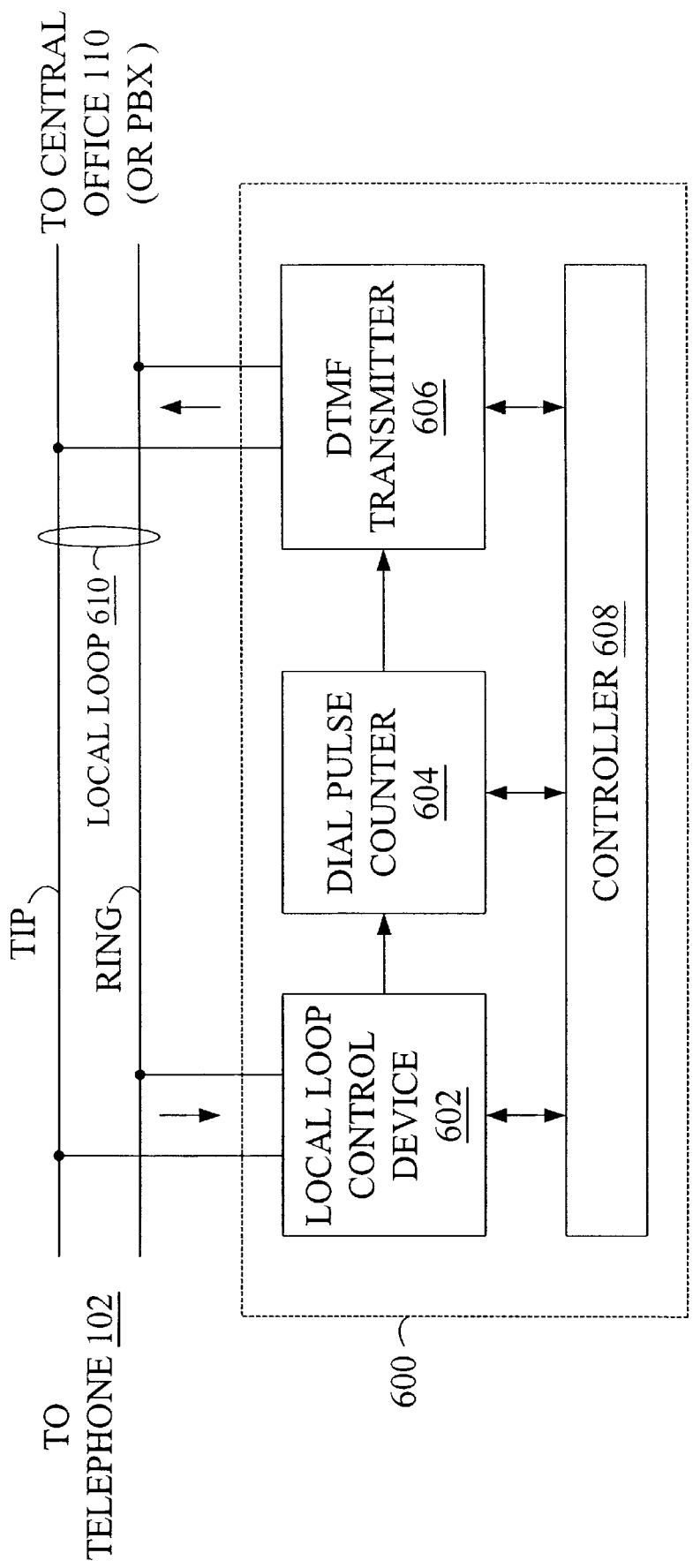
FIG. 6 depicts an example caller-side combined mode signaling device.

FIG. 6 depicts an example CMS device 600 coupled to the caller's local loop. Local loop CMS device 600 includes a local loop control device 602, a dial pulse counter 604, a DTMF transmitter 606, and a controller 608. Local loop CMS device 600 is connected to a local loop 610, between telephone 102 and central office 110. FIG. 6 depicts CMS device 600 connected in parallel to the local loop telephone lines. Other connections are contemplated according to the present invention, such as serial connections to local loop 610, as described in greater detail below.

Figure 7:
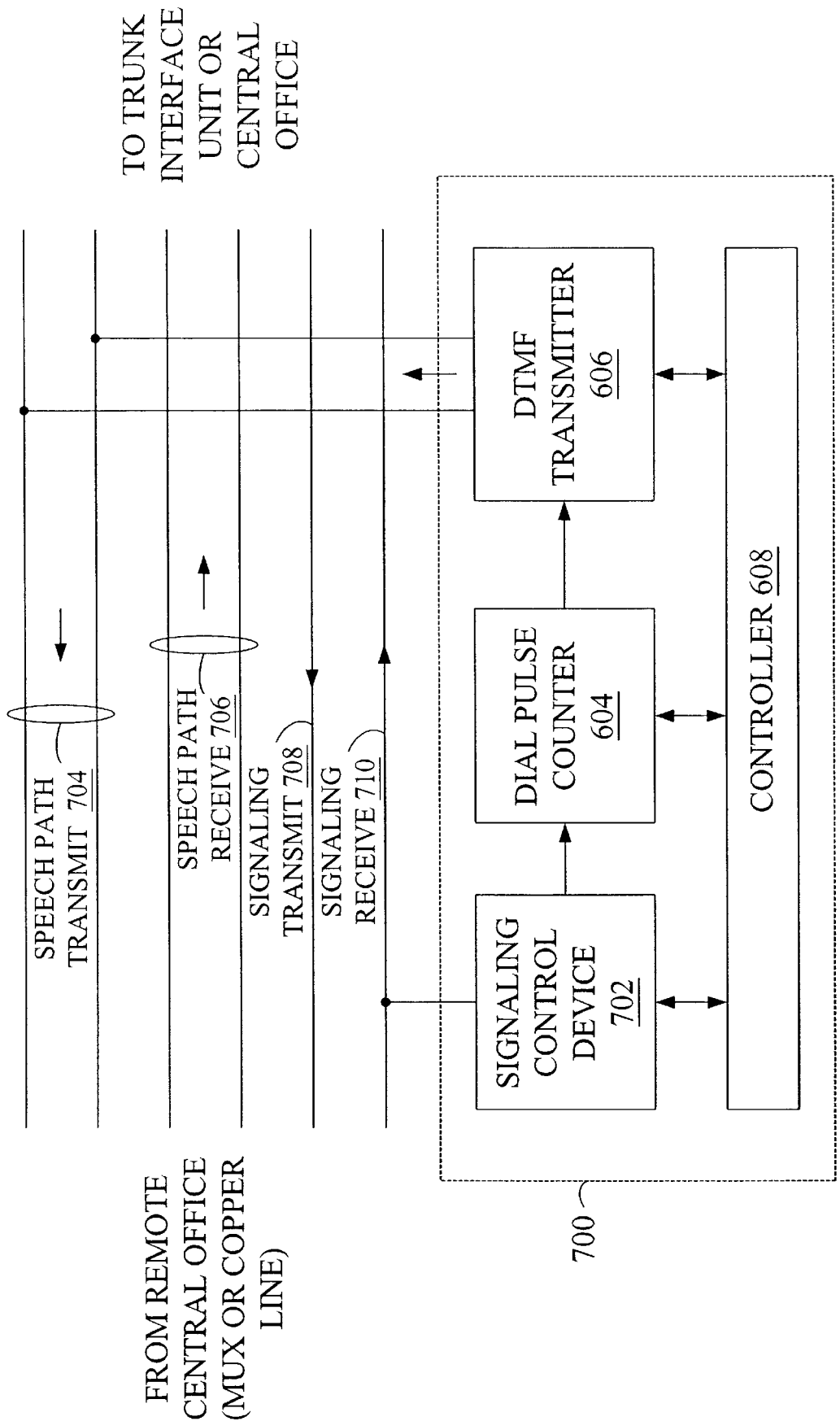
FIG. 7 depicts an example central office side combined mode signaling device.

FIG. 7 depicts an example CMS device 700 coupled to a trunk interface that includes a speech path transmit connection 704, a speech path receive connection 706, a signaling transmit line 708, and a signaling receive line 710. Example trunk interface CMS device 700 includes a signaling control device 702, dial pulse counter 604, and DTMF transmitter 606, where the latter two components can be implemented in the same manner as the corresponding components within CMS device 600. Trunk interface CMS device 700 can be connected to equipment within central office 110 (subscriber or trunk side of the switches) in different ways, as described in greater detail below. In the example embodiment of FIG. 7, signaling control device 702 is connected to signaling receive line 710, and DTMF transmitter 606 is connected to speech transmit path 704. For both CMS devices 600 and 700, controller 608 performs the control and timing operations necessary to cause the device to operate as described below.

Figure 8:
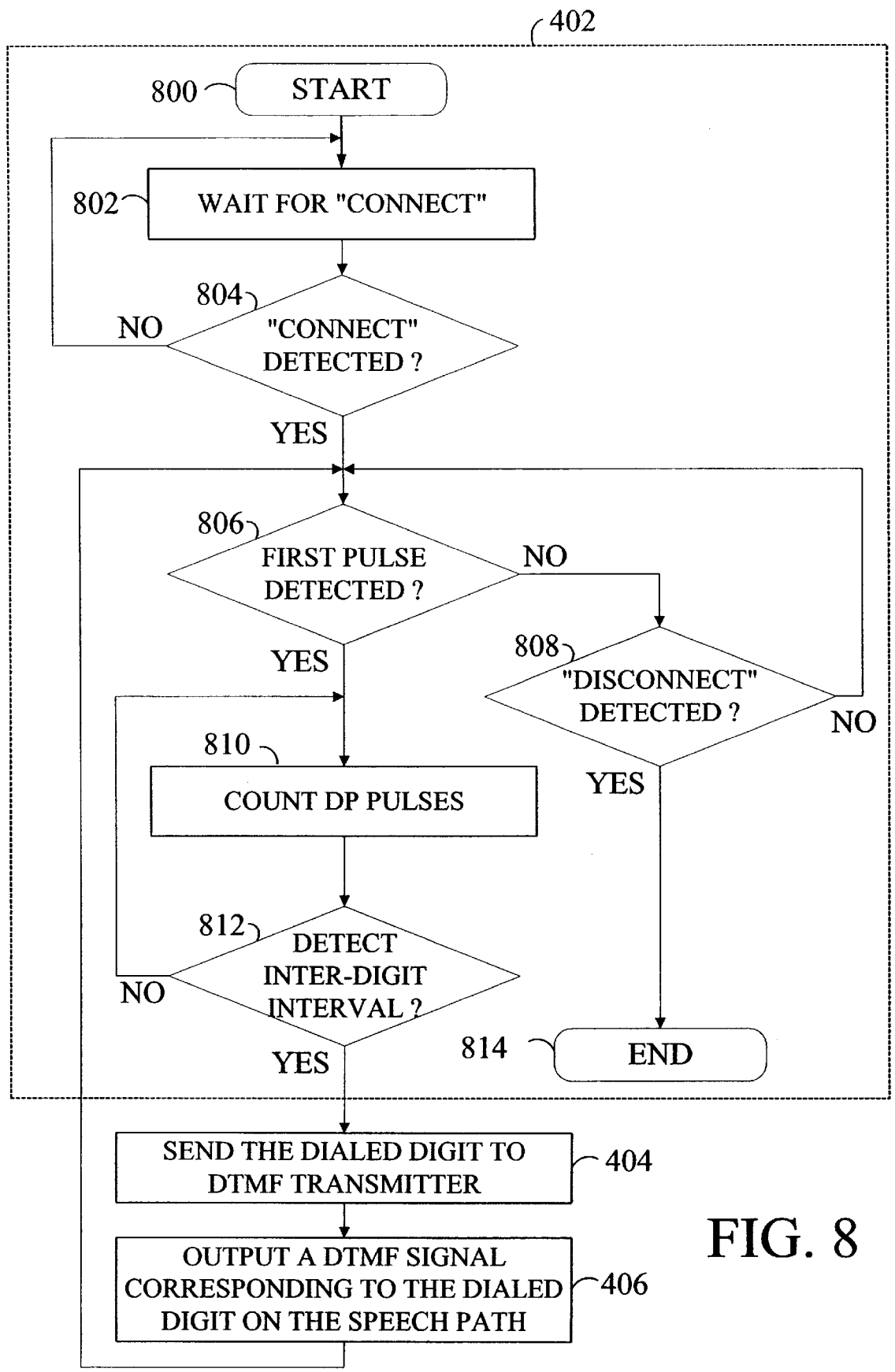
FIG. 8 is a flowchart that describes in greater detail the step of monitoring DP signals until a dialed digit is recognized.

The operation of local loop CMS device 600 and trunk interface CMS device 700 will be described with respect to FIG. 8 which is a flowchart that describes step 402 in greater detail according to an example embodiment of the present invention. CMS operation begins in step 800. It is assumed that the CMS device is receiving power, for example, by supplying the device with persistent power or by turning on the device when in use.

In step 802, the CMS device waits for a "connect" signal indicating that the caller is preparing to make a call using telephone 102. The type of connect signal, and the manner in which the connect signal is detected, can vary for different CMS devices. For example, with respect to local loop CMS device 600, local loop control device 602 monitors local loop 610 for the off-hook condition, which indicates that the caller is preparing to make a call. As a second example, with respect to trunk interface CMS device 700, signaling control device 702 monitors signaling receive line 710 for a connect signal that is typically a seizing signal that can be sent between trunks to indicate the beginning of a DP signal transmission. For example, the seizing signal can be a pulse having a duration different from the DP make and break signals.

In step 804, once the connect signal has been detected, the CMS device begins looking for the appearance of the first pulse in the DP digit train in step 806. Until the first pulse is detected, the CMS device in step 808 also checks for the appearance of a "disconnect" signal. As described above with respect to the connect signal, the disconnect signal can vary for different CMS devices. For example, local loop control device 602 monitors local loop 610 for the on-hook condition, whereas signaling control device 702 monitors signaling receive line 710 for a pulse disconnect signal. If a disconnect signal is detected before the first pulse is detected, then in step 814 the CMS device ceases operation.

Once the first pulse is detected in step 806, the CMS device in step 810 monitors and counts the pulses of the DP digit train, while checking for the beginning of the inter-digit interval in step 812. With respect to CMS device 600, DP pulses are monitored on local loop 610 by local loop control device 602 and passed to dial pulse counter 604. With respect to CMS device 700, signaling control device 702 monitors DP pulses on signaling receive line 710 and passes the pulses on to dial pulse counter 604.

Once the inter-digit interval is detected, in steps 404 and 406 the received DP digit count is sent to a DTMF transmitter and the DTMF signal corresponding to the digit count is output to the speech path. Dial pulse counter 604 sends the pulse count to DTMF transmitter 606. DTMF transmitter 606 outputs the DTMF signal to local loop 610 in CMS device 600, and to speech path transmit 704 (in the direction of IVR system 106) in CMS device 700. Operation continues in step 806, where the CMS device begins looking for the first pulse in the next DP train, while checking for the disconnect signal.

The components of CMS devices 600 and 700 are preferably implemented as relatively simple and inexpensive hardware. However, CMS devices 600 and 700 can also be implemented as software routines running on an inexpensive microprocessor. According to this alternative embodiment, the components of CMS devices 600 and 700 can be implemented as separate software modules, or as separate functional portions of a single software module.

The following sections describe various CMS device embodiments implemented on the caller-side and on the CO-side.

Caller-Side CMS Devices

Various caller-side CMS device embodiments are contemplated according to the present invention. As a first example caller-side CMS device, telephone 102 can be adapted to include built-in CMS capability. As a second example, a stand-alone CMS device can be connected to the caller's telephone line that will make old telephones, including pulse and rotary sets, completely CMS enabled.

Telephones with Built-in CMS Capability

The design of conventional DP and DTMF-capable telephones can be adapted to accommodate CMS capability. According to an example embodiment of the present invention, CMS-capable telephones can include a dialing mode switch (not shown) that has three positions: DP mode, DTMF mode, and CMS mode. According to a second example embodiment, CMS-capable telephones can include a dialing mode switch that has two positions: DTMF mode and CMS mode. This second example embodiment is possible because CMS signaling can typically be used in place of DP signaling.

CMS-capable telephones can operate as follows. When the dialing mode switch is placed in the CMS position and the caller presses the buttons on the telephone's keypad to dial the desired number, the corresponding CMS signal is transmitted over the local loop. Each dialed digit is transmitted as a DP signal and a DTMF signal.

According to another aspect of the present invention, CMS-capable telephones having a keypad input device can effectively handle "#" and "*" inputs so that the caller may communicate with IVR systems 106 which use one or-both of these inputs in their menus. When the telephone is placed in CMS mode and keys "#" or "*" are pressed, the CMS signal that is transmitted includes the appropriate DTMF signals corresponding to the key that is pressed. Since there is no DP equivalent of either "#" or "*", the CMS signal corresponding to these inputs does not contain any DP pulses.

According to an example embodiment of the present invention, conventional telephones without CMS capability, having dial mode switch with two positions: DP and DTMF, having a keypad input device can be adapted to effectively handle "#" and "*" inputs in DP mode so that the caller may communicate with IVR systems 106 which use one or both of these inputs in their menus. When the telephone is placed in DP mode and keys "#" or "*" are pressed, the output signal that is transmitted includes the appropriate DTMF signals corresponding to the key that is pressed. That feature allows the caller to communicate with IVR systems 106 which use one or both of these inputs in their menus, while leaving all other features of the telephone unchanged.

Stand-Alone Caller-Side CMS Devices

Stand-alone caller-side CMS devices are typically connected to the caller's local loop, and therefore can be implemented as shown in FIG. 6. These devices can be used by business and residential subscribers that dial using DP mode, whether the caller is connected directly to central office 110, or to a business telephone switch such as a PBX. Stand-alone devices can be made for permanent installation or as a travel kit for accessing IVR services when visiting regions that do not provide DTMF service. The devices designed for permanent installation are preferably connected using modular cords, but hardwiring the device to screw terminals should also be an option to account for varying wiring standards in different countries. Permanent installation devices are preferably powered by the telephone line, but can alternatively be powered by plugging into a wall outlet or using battery power.

Figure 9:
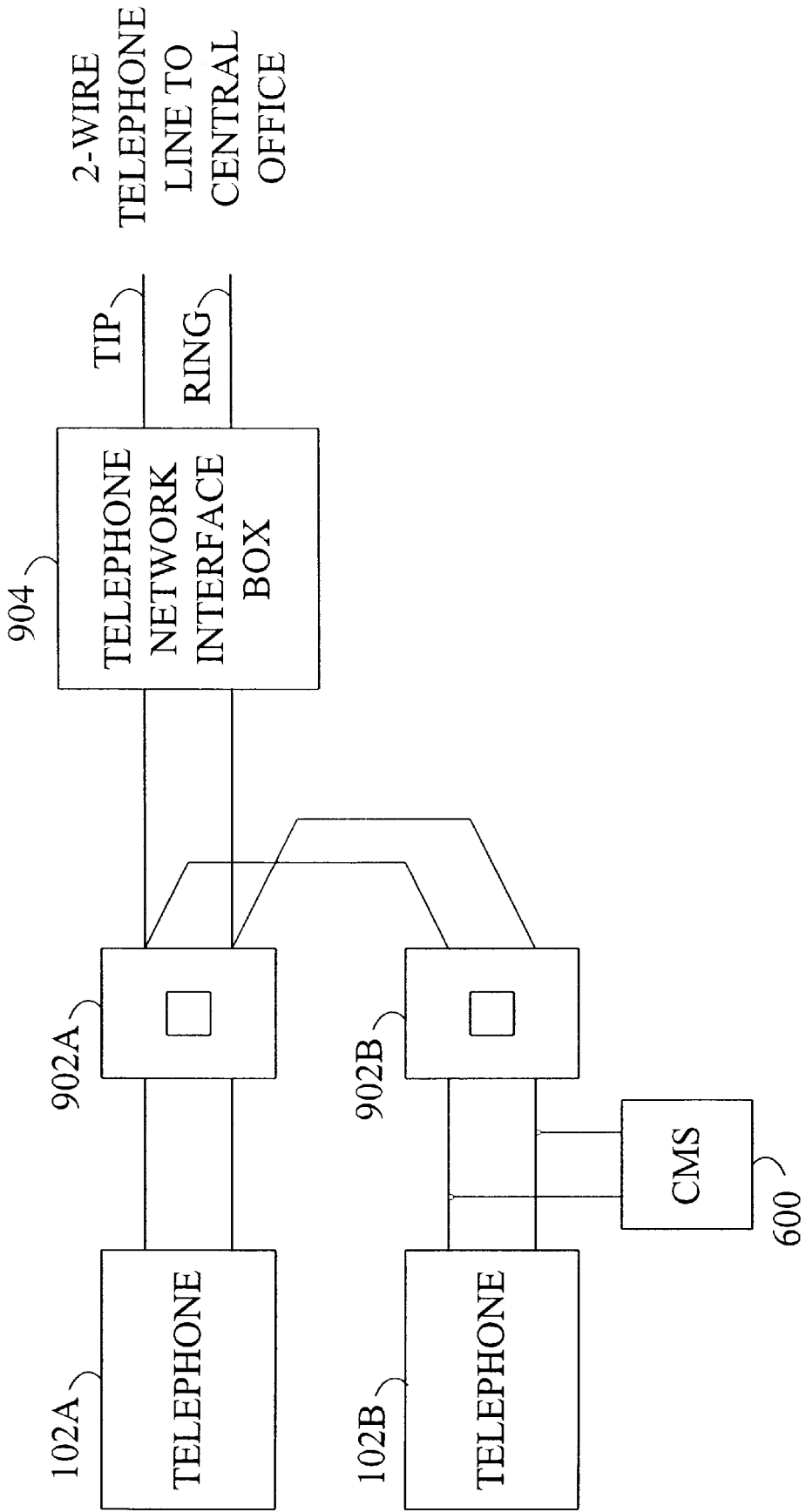
FIG. 9 depicts an example parallel connection for a caller-side combined mode signaling device.

Stand-alone caller-side CMS devices can be connected using either a parallel or serial connection. FIG. 9 depicts an example parallel connection for local loop CMS device 600. In a typical house, apartment or business there are typically two or more telephones 102 (shown as 102A and 102B) connected in parallel via a telephone jack 902 (shown as 902A and 902B) to the two-wire telephone line going to central office 110. Private homes are often equipped with a network interface box 904, which is installed outside or inside the house. In apartment buildings, the two-wire lines from central office 110 are typically terminated at telephone jack 902, which is frequently connected in parallel to the telephone jacks in other rooms.

By using a parallel connection, a single CMS device 600 can provide CMS signaling for all telephones 102 connected in the same parallel circuit with the CMS device. The parallel connection can be easily achieved using a single modular cord at any telephone jack 902 in the parallel circuit with a common Y-type adapter. The parallel connection also allows for less interference with telephone line parameters due to high input impedance.

Figure 10:
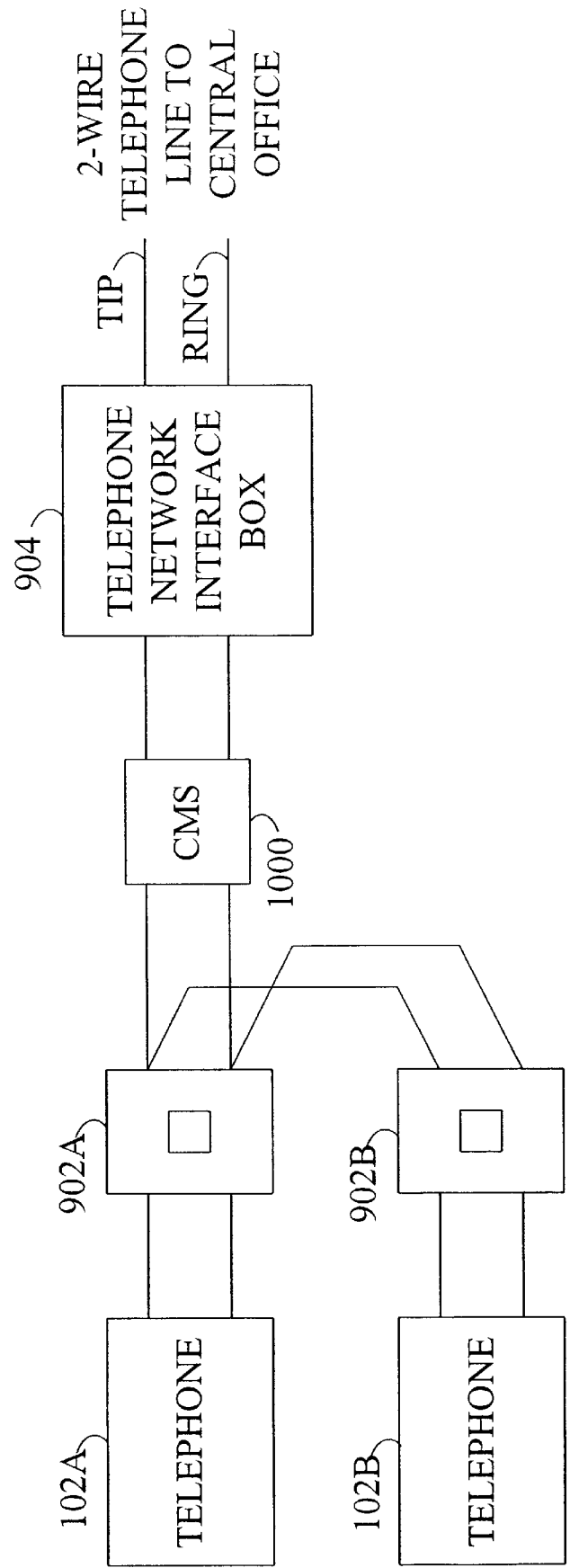
FIG. 10 depicts a first example serial connection where a combined mode signaling device is connected between the telephone jacks and the telephone network interface box.
Figure 11:
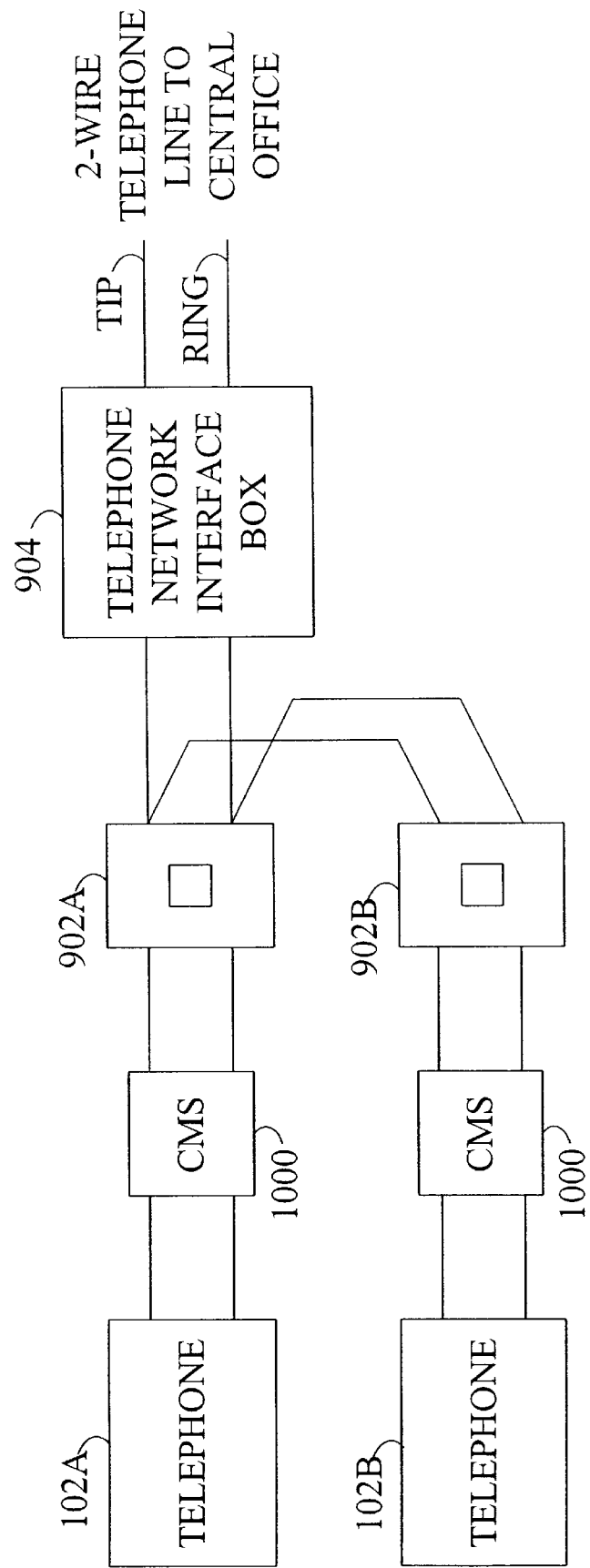
FIG. 11 depicts a second example serial connection where a combined mode signaling device is connected between the telephone and the telephone jack.

FIGS. 10 and 11 depict example serial connections for caller-side CMS device 1000. Serial CMS device 1000 can be implemented in a manner similar to that depicted in FIG. 6, except that the CMS device is placed within local loop 610 in serial fashion. FIG. 10 depicts a first example serial connection where CMS device 100 is connected between the telephone jacks 902 and telephone network interface box 904. In this example embodiment, a single CMS device 1000 can be used to enable CMS dialing from all telephones connected to this line. The CMS device can be installed anywhere between telephone network interface box 904 and the first telephone jack at a particular location, or in some cases, directly between the line input (i.e., the point where the line from CO enters user's premises) and the first telephone jack.

In some circumstances, implementation of the serial connection depicted in FIG. 10 can be difficult. For example, it can be difficult to access the wiring between telephone jack 902 and telephone network interface box 904, particular in older buildings. In these circumstances, it might be easier to connect a different serial CMS device 1000 to each telephone 102, as shown in FIG. 11. Here, the savings in labor might more than make up for the expense of additional CMS devices 1000.

According to another example embodiment of the present invention, a universal parallel/serial CMS device is also contemplated that can be switched from parallel to serial connections.

CO-Side CMS Devices

Various CO-side CMS device embodiments are contemplated according to the present invention. These devices can be quickly and conveniently installed within telephone network 104, obviating the need for installing new equipment at the caller's location. And depending upon where the CMS device is located, each device can provide CMS service to multiple callers. The telephone company can now provide these CMS-capable callers with a wide range of IVR services These services can be offered to companies that still use older type PBX switches, so that their employees can access efficiency enhancing IVR services. Furthermore, call completion rates are increased for those callers provided with CMS service. The combination of being able to offer high-margin IVR services and an increased call completion rate can significantly increase telephone company revenues.

CO-side CMS devices can generally be divided into three main categories: those devices connected directly to the caller's local loop but located within telephone network 104 (referred to herein as CO-LL CMS devices), those devices connected between a subscriber switching unit and a speech path interface (referred to herein as CO-SP CMS devices), and those devices connected between a trunk interface and transmission or multiplexing equipment, such as, for example, E1 (30 channel European standard) or T1 (24-channel USA standard) multiplexing equipment (referred to herein as CO-TR CMS devices). The CO-LL CMS devices each service a single caller (though possibly multiple phones at the caller's location), whereas the CO-SP and CO-TR CMS devices each service many callers. All three categories of CO-side CMS devices can be used within central offices 110. Further, CO-SP and CO-TR CMS devices (as well as other categories of CMS devices) can be used by businesses with a PBX or any other type of business telephone system, as well as users of centrex type services Each of these three categories of CO-side CMS devices is described in greater detail in the following sections.

CO-LL CMS Devices

Figure 12:
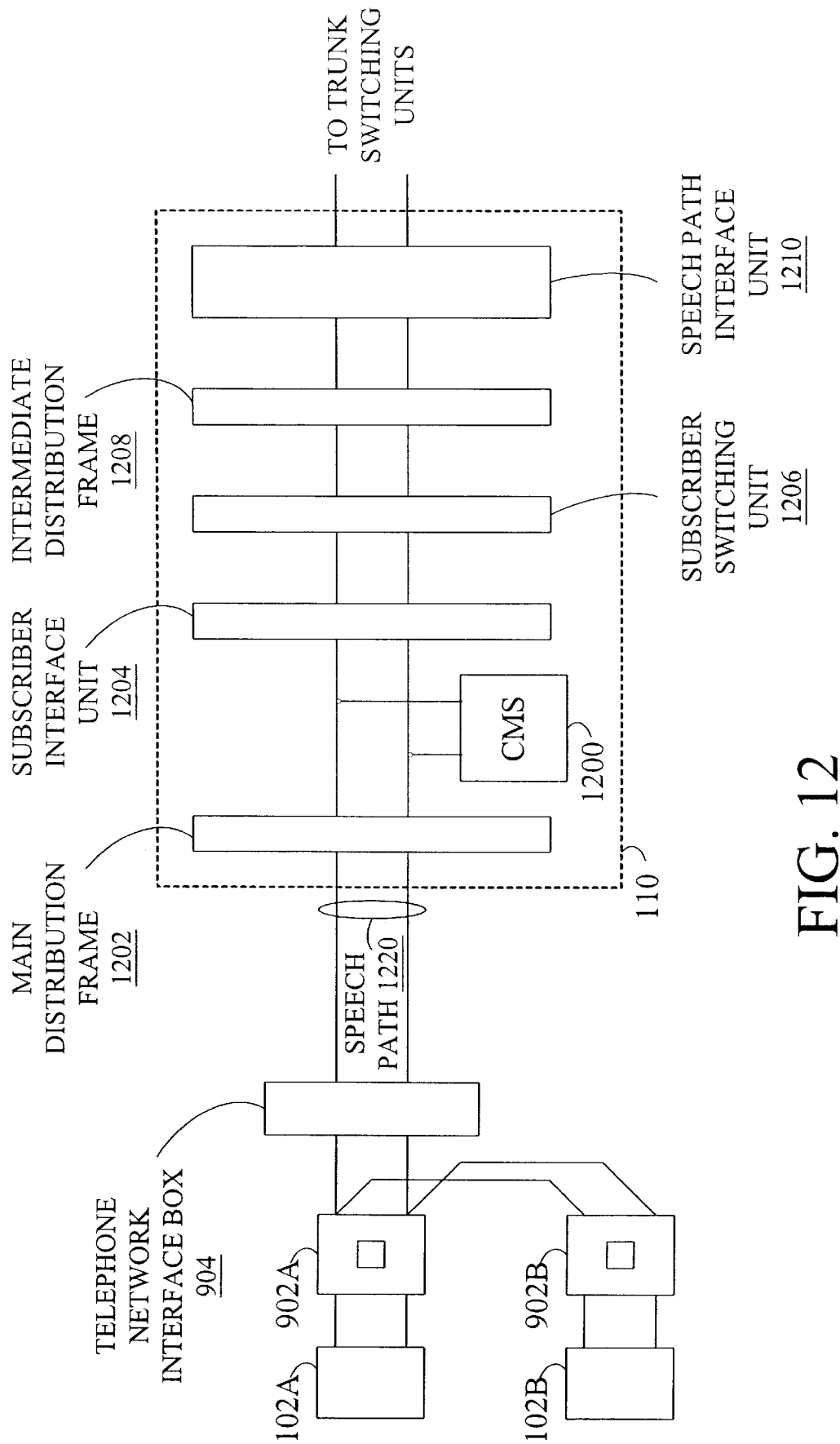
FIG. 12 depicts an example central office/local loop combined mode signaling device according to an example embodiment of the present invention connected in parallel within the central office.
Figure 13:
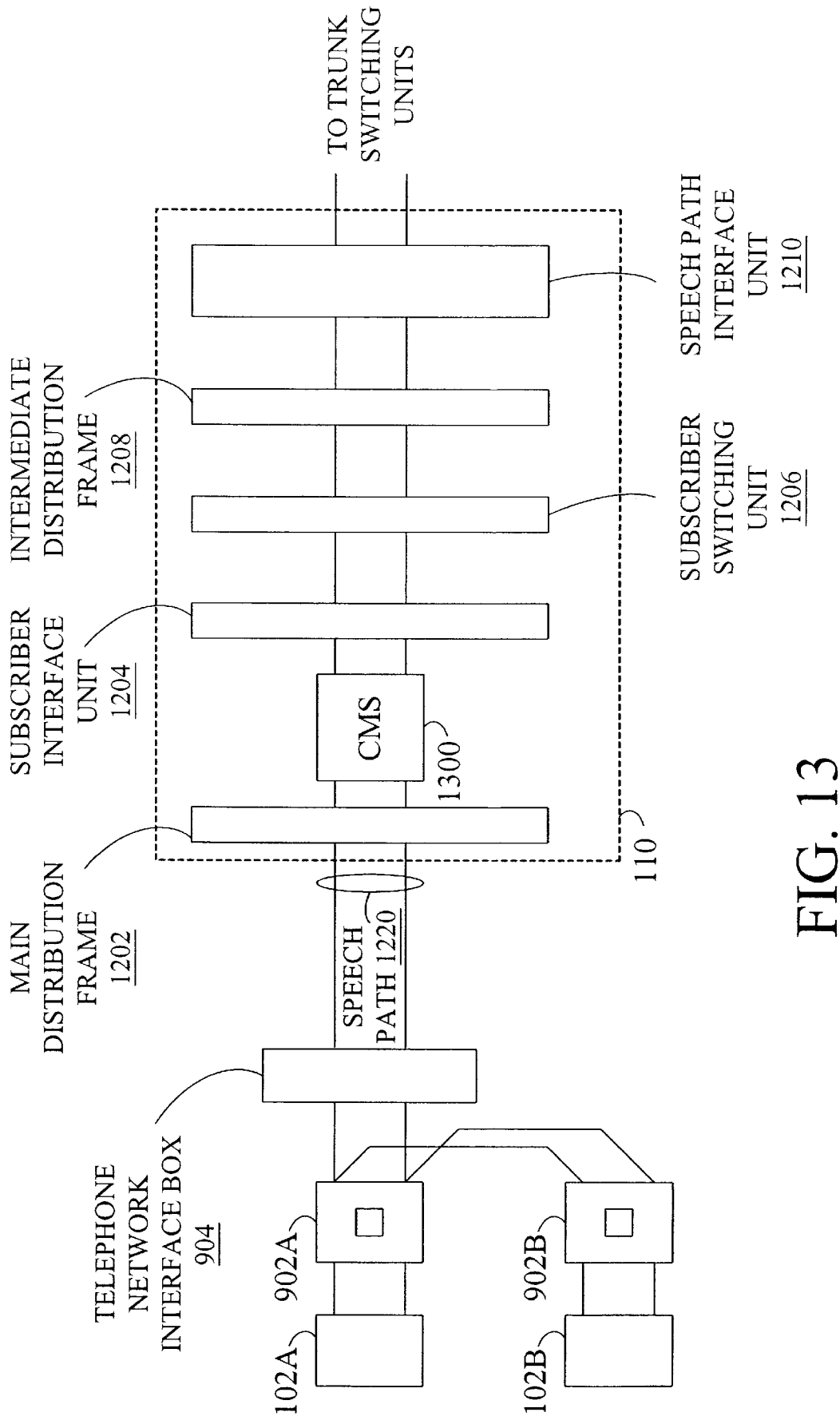
FIG. 13 depicts an example central office/local loop combined mode signaling device according to an example embodiment of the present invention connected in serial fashion between a main distribution frame and a subscriber interface unit.

CO-LL CMS devices can be implemented in a manner similar to the local loop CMS devices 600 because both devices are connected to lines with the same type of signaling, i.e., loop start two-wire circuits (even though CO-LL CMS devices are connected at the central office 110 and caller-side CMS devices are connected at the caller's location). FIG. 12 depicts an example CO-LL CMS device 1200 according to an example embodiment of the present invention connected in parallel within central office 110. Central office 110 can include one or more components, such as a main distribution frame 1202, a subscriber interface unit 1204, a subscriber switching unit 1206, an intermediate distribution frame 1208, and a speech path interface unit 1210 that is connected to trunk switching units of telephone network 104. The components of central office 110 can vary dramatically from one locale to another; those shown in FIG. 12 are intended to provide a common example configuration. As shown in FIG. 12, CO-LL CMS device 1200 is preferably connected in parallel between main distribution frame 1202 and subscriber interface unit 1204. FIG. 13 depicts an example CO-LL CMS device 1300 according to an example embodiment of the present invention connected in serial fashion between main distribution frame 1202 and subscriber interface unit 1204.

Though CO-LL CMS device 1200 can be implemented using functional components similar to those described with respect to local loop CMS device 600, there are some differences between the two. First, CO-LL devices do not need individual packaging. They can be designed for installation on high-density printed circuit boards, which can be mounted on racks or cabinets within central office 110, thereby reducing the per-caller cost of providing CMS service. Second, CO-LL devices can be powered directly from the central office power supply. Third, main distribution frame 1202 protects the CO-LL devices from dangerous voltages and overloads from the outside world (e.g., lightning voltage), thereby simplifying the design of the device and further reducing costs.

According to the present invention, CO-LL CMS devices can be connected within main distribution frame 1202, within subscriber interface unit 1204, or somewhere in-between (as shown in FIG. 12). The best solution can depend upon local conditions and requirements, as well as the type of central office 110 and main distribution frame 1202 equipment. CO-LL CMS devices can be connected using, for example, modular cables with 50-pin amphenol connectors, as well as hardwiring (e.g., soldering) the device to the central office equipment terminals.

A single CO-LL CMS device, whether connected in parallel or serial fashion, can be used to provide CMS service to all telephones connected to the local loop. Further, by using CO-LL CMS devices, telephone companies can conveniently enable CMS capability individually for each caller and charge activation and monthly fees for this enhanced feature.

CO-SP CMS Devices

CO-SP CMS devices are also connected to loop start two-wire circuit lines, and like CO-LL CMS devices, can be implemented using functional units similar to those described above with respect to local loop CMS device 600. The connection of CO-SP CMS devices can depend upon the configuration of central office 110. The configuration of central offices 110 can vary widely, depending on, for example, the configuration of telephone network 104, the central office equipment manufacturer and model, and restrictions placed upon the configuration by local regulations. However, the basic operations performed by many central offices once the caller lifts the telephone handset can be similar.

For example, consider the operations performed by a typical crossbar-type central office 110 (as depicted in FIG. 12) when a phone call is made. At the outset, when telephone 110 is not in use (on-hook condition), the local loop is open inside telephone 110. When the caller wants to make a call and lifts the handset (i.e., goes off hook), the local loop closes, beginning the connection phase. Subscriber interface unit 1204 recognizes this as a caller's request to place a phone call. Central office 110 then connects the caller's line to a device (not shown) that provides a dial tone and monitors digits dialed by the caller. Once an acceptable number of digits have been received, central office 110 establishes a connection through the network to the called party.

At the end of the connection process, speech path interface 1210 (this device is referred to in practice by many different names, and can vary widely in functionality) performs several operations: provides line battery power to the calling party (and in some cases to the called party as well) phone line for normal telephone operation; sends a ring back signal to the calling party; sends a ring signal to the called party, though in some cases a different device at the called party end of the established connection path performs this function; monitors the line to recognize the time at which the called party goes off-hook (i.e., answer supervision); disconnects the ring-back and ring signals from the line and establishing the final speech path; provides the necessary power to switching devices in order to hold the established speech path; and monitors both parties to recognize when either party hangs up (i.e., disconnect supervision).

Speech path interface unit 1210 begins receiving digits from telephone 110 during the interaction phase, once the connection to IVR system 106 has been established. Prior to this point, during the connection phase, the dialed digits are routed to devices (e.g., registers in any crossbar-type central office) within central office 110 which store, analyze and then send the digits to other control units to establish the connection path through telephone network 104. CO-SP CMS devices therefore provide CMS signaling during the interaction phase, but may not during the connection phase, depending upon the switch configuration.

Each CO-SP CMS device can be used to provide CMS service to multiple telephones 102. Central office 110 typically services a large number of telephones 102. The number of speech path interface units 1210 required within central office 110 is calculated using traffic engineering formulas that depend upon traffic volume and quality of service requirements. In any event, one or more speech path interface units 1210 service a large group of telephones 102, where the size of this group can depend upon subscriber switching unit 1206. Subscriber switching unit 1206 and speech path interface unit 1210 are typically connected using cross-connects within intermediate distribution frame 1208. As a result, each CO-SP CMS device installed before speech path interface unit 1210 will be used by group of subscribers, as compared to each CO-LL CMS device servicing a single subscriber. CO-SP CMS devices can also be installed within speech path interface unit 1210, within intermediate distribution frame 1208, or anywhere in between with the same result.

For example, the number of subscribers per speech path interface unit 1210 can vary between 8:1 and 12:1, averaging around 10:1. In other words, each speech path interface unit 1210 services an average of 10 subscribers. As a result, the total number of CO-SP CMS devices that are necessary to provide CMS service for all subscribers of a particular central office 110 will be on average ten times less than the number of subscribers, thereby reducing total cost for providing CMS service by a factor of ten as compared to CMS devices that each service a single subscriber.

However, CO-SP CMS devices may not work properly with those IVR systems 106 that require outbound dialing, because the CO-SP CMS device may not be present in the speech path of the incoming call made by IVR system 106 from some central offices 110. Further, CO-SP CMS devices may prevent the telephone company, absent design modifications to the central office equipment, from assigning CMS service on a per line basis. This may limit the telephone company's ability to charge activation and monthly fees for CMS service.

With respect to step-by-step type central offices 130, digits dialed by the caller are not stored. Selector equipment within telephone network 106 uses the dialed digits to establish the desired connection. The operations performed above with respect to speech path interface unit 1210 are typically handled by the first group selector within step-by-step type central offices 110. CO-SP CMS device may therefore be connected before the first group selector within step-by-step type central offices 110 with results similar to those described above with respect to CO-SP CMS devices connected to speech path interface unit 1210.

Figure 14:
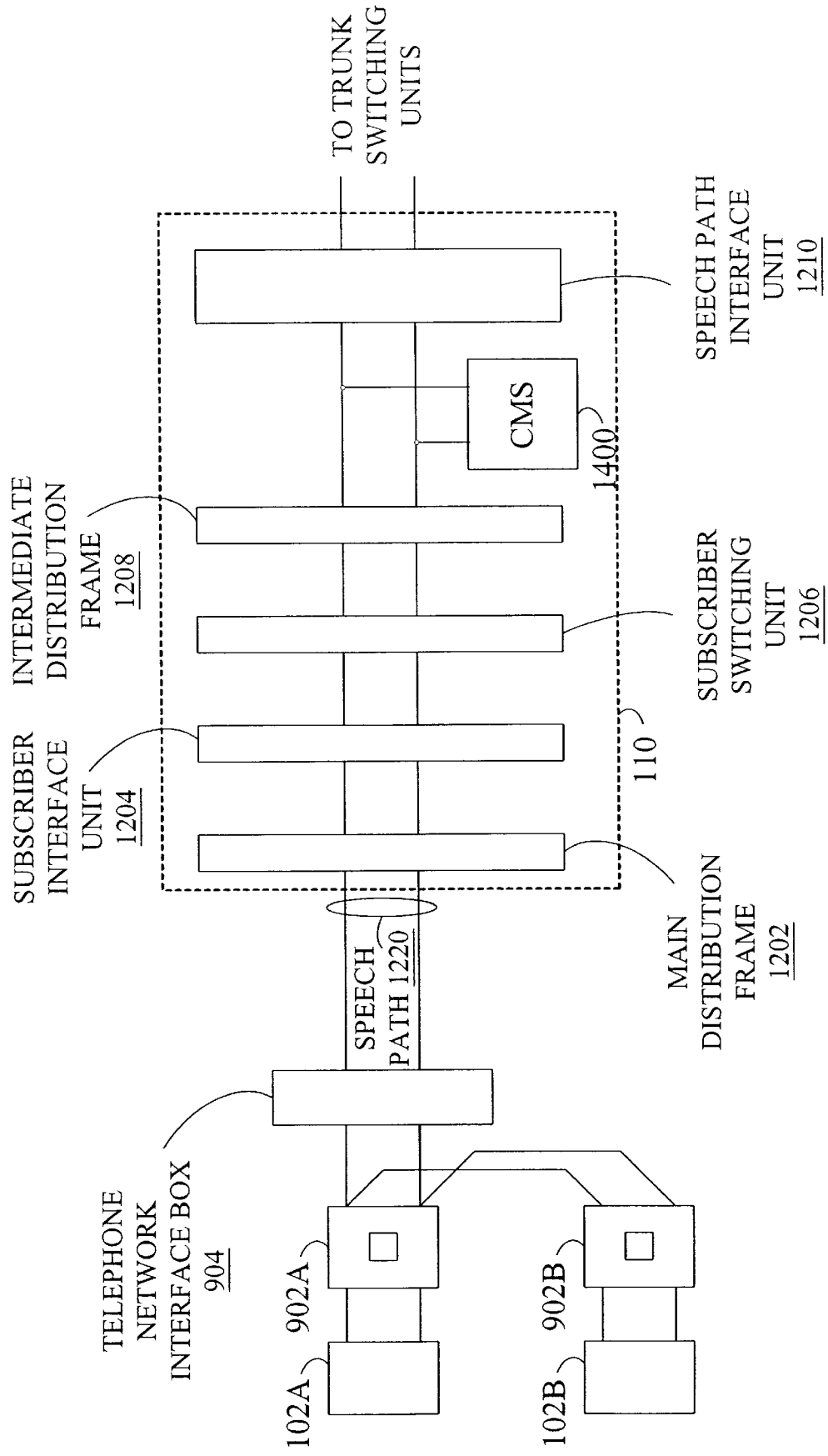
FIG. 14 depicts an example central office/speech path interface unit combined mode signaling device connected in parallel at the input of a speech path interface unit.
Figure 15:
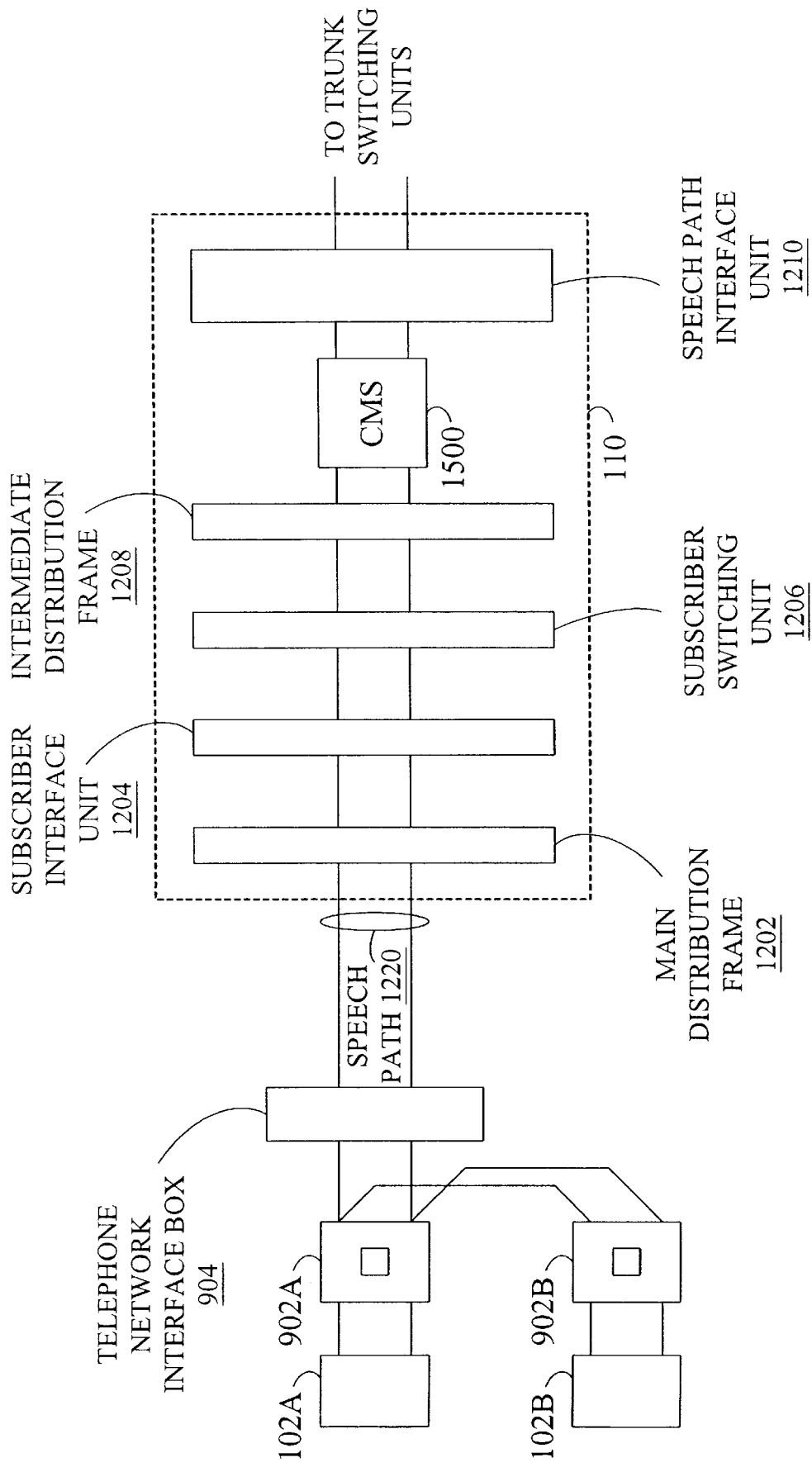
FIG. 15 depicts an example central office/speech path interface unit combined mode signaling device connected in serial at the input of a speech path interface unit.

According to an example embodiment of the present invention, CO-SP CMS devices can be connected to the tip and ring wires of the speech path at the input of speech path interface unit 1210 (or similar unit). These CO-SP CMS devices monitor DP pulses from the same lines (tip and ring wires) that the corresponding DTMF signal is output on, and can be implemented as described above with respect to local loop CMS device 600. FIG. 14 depicts an example CO-SP CMS device 1400 connected in parallel at the input of speech path interface unit 1210. FIG. 15 depicts an example CO-SP CMS device 1500 connected in serial at the input of speech path interface unit 1210.

Figure 16:
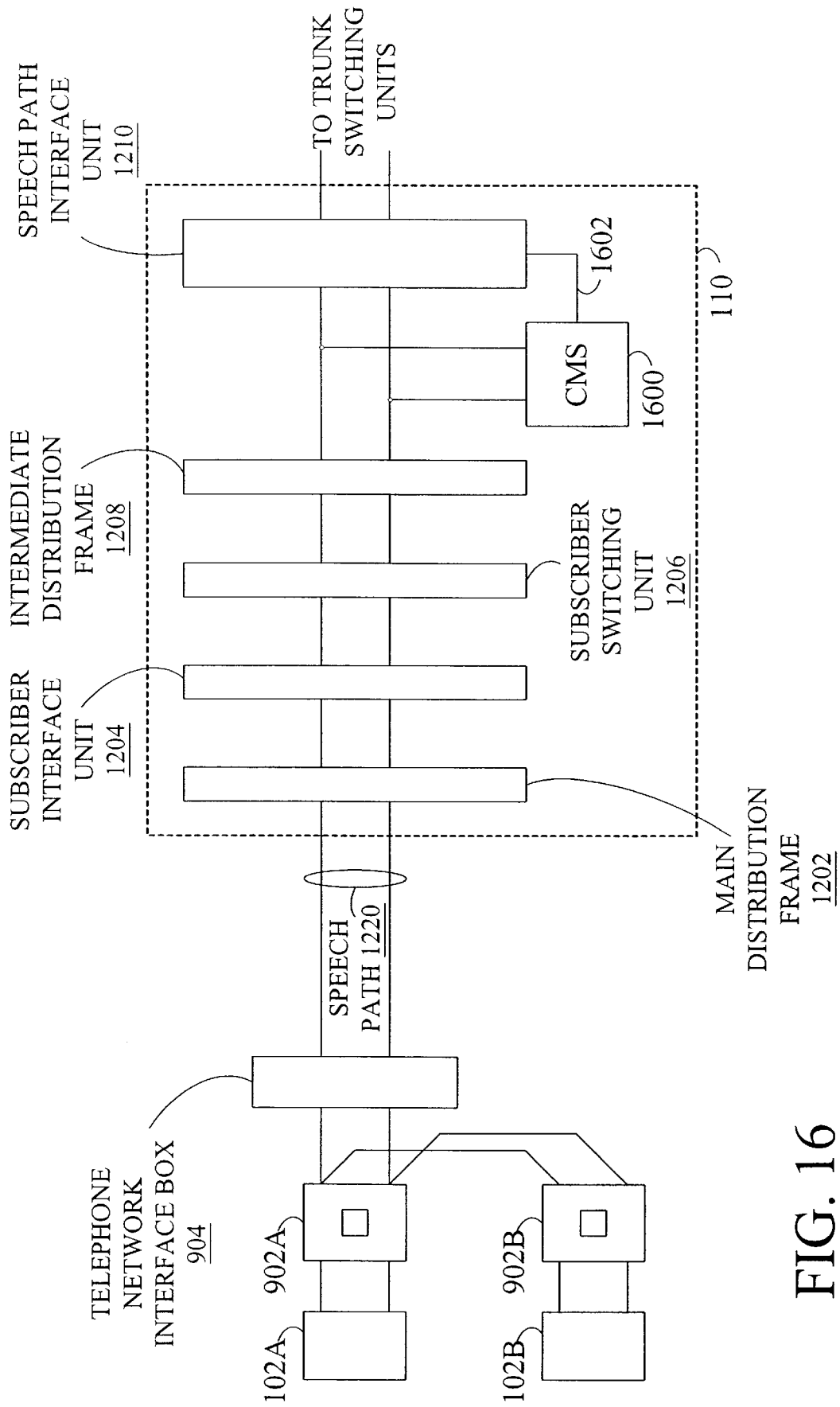
FIG. 16 depicts an example central office/speech path interface unit combined mode signaling device connected in parallel at the input of a speech path interface unit, with an additional connection to the appropriate signaling line corresponding to the speech path interface unit.
Figure 17:
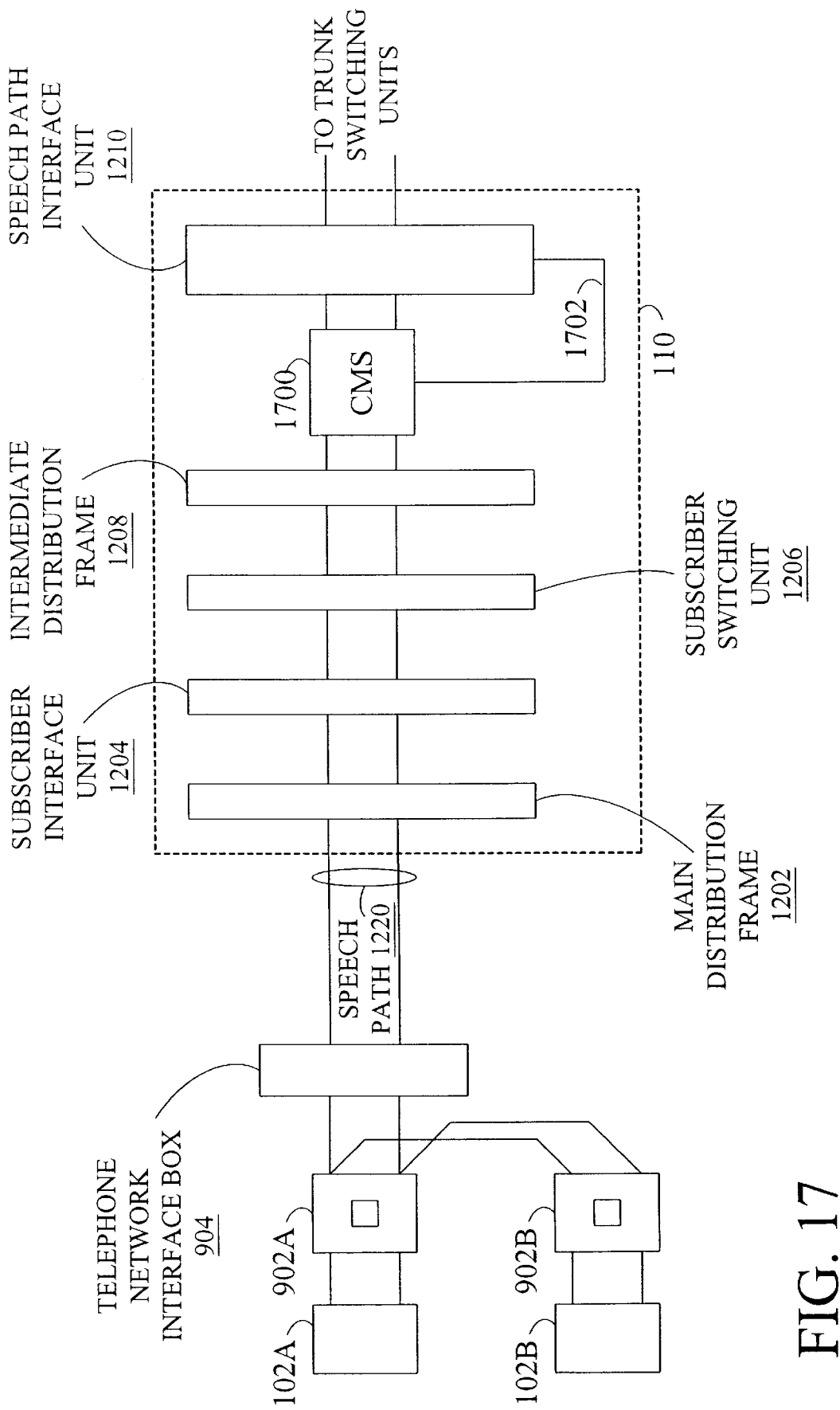
FIG. 17 depicts an example central office/speech path interface unit combined mode signaling device connected in serial at the input of a speech path interface unit, with an additional connection to the appropriate signaling line within the speech path interface unit.

According to another example embodiment of the present invention, CO-SP CMS devices can be connected not only to the tip and ring wires of the speech path at the input of speech path interface unit 1210 (or similar unit), but also to one (or more) signaling lines from speech path interface unit 1210 that receive or otherwise indicate the dialed DP digits. These CO-SP CMS devices receive DP signals from these signaling lines and send the corresponding DTMF equivalent over the wires of the speech path. FIG. 16 depicts an example CO-SP CMS device 1600 connected in parallel at the input of speech path interface unit 1210, with an additional connection 1602 to the appropriate signaling line from speech path interface unit 1210. FIG. 17 depicts an example CO-SP CMS device 1700 connected in serial at the input of speech path interface unit 1210, with an additional connection 1702 to the appropriate signaling line from speech path interface unit 1210.

The signaling line from speech path interface unit 1210 that receives or otherwise indicates the dialed DP digits can vary from one unit to the next. For example, speech path interface units 1210 typically include an element (e.g., a relay or an electronic device) that provides line battery power to the calling party line for normal telephone operation. This element receives DP pulses corresponding to each DP digit dialed during the interaction phase because the element is connected to the calling party's local loop. Lines 1602 and 1702 can be connected to an output of this element (e.g., the relay's contact) so that the CMS device (1600 or 1700, respectively) can monitor the DP pulses as well. As a result, CMS devices 1600 and 1700 are relieved of the responsibility of monitoring the condition of the local loop (e.g., detecting on-hook and off-hook conditions) because that function is already performed by the above mentioned element of speech path interface unit 1210. This fact may help to simplify CMS-SP design.

According to other example embodiments of the present invention, signaling lines from other components with central office 110 can be monitored by the CMS device, where the signaling line receives or otherwise indicates the dialed DP digits. The particular signaling line used can vary from one central office component to the next. For example, any of the central office components described above with respect to FIG. 12 could conceivably include a signaling line that could be monitored by a CMS device, depending upon the implementation of the components.

As described above with respect to the CO-LL CMS devices, CMS CO-SP devices can be implemented at the board level and do not require individual packaging, resulting in a per-device cost savings. CMS CO-SP devices can be powered from the central office 110 power supply and are protected from power surges by main distribution frame 1202.

CO-TR CMS Devices

Figure 18:
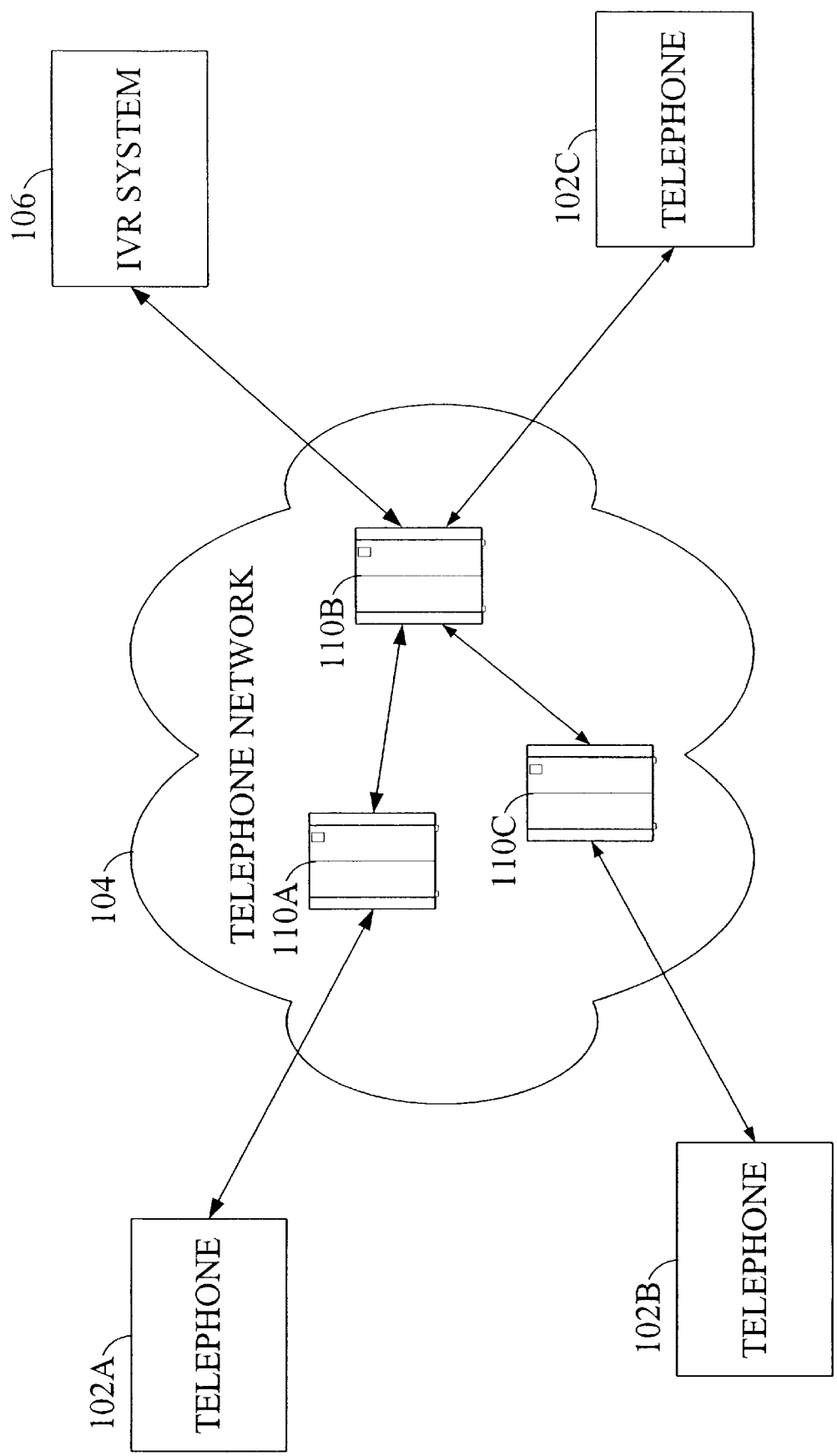
FIG. 18 depicts a second example telephony environment, wherein the telephone network includes a main central office connected to two remote central offices.

CO-TR CMS devices can be connected to the trunk lines between switches. For example, CO-TR CMS devices can be connected to the wires between trunk interfaces and transmission or multiplexing equipment. These connections can have three or more wires. These CMS devices can be connected to a main central office 110 in order to provide remote central offices with access to IVR systems 106, without having to travel to and install a device at the remote office. FIG. 18 depicts a second example telephony environment 1800, wherein telephone network 104 includes a main central office 110B connected to two remote central offices 110A and 110C. CO-TR CMS devices can be connected to main central office 110B that provide CMS services to those telephones 102 (102A and 102B in FIG. 18) connected to remote central offices 110A and 110C.

Many countries throughout the world have implemented telephone networks 104 having the configuration depicted in FIG. 18. Main central office 110B is typically located in the administrative center of the geographical region. One or more remote central offices (shown as 110A and 110C in FIG. 18) are located in villages or small towns within the region serviced by main central office 110B. The description herein with respect to remote central offices also applies to PBX and other business telephone equipment. Connections to remote caller's telephones 102A and 102B go through both the main and remote central offices. Local government offices and many businesses are typically located in the administrative center. As a result, most IVR systems 106 are also located in the administrative center and are therefore connected to main central office 110B.

Figure 19:
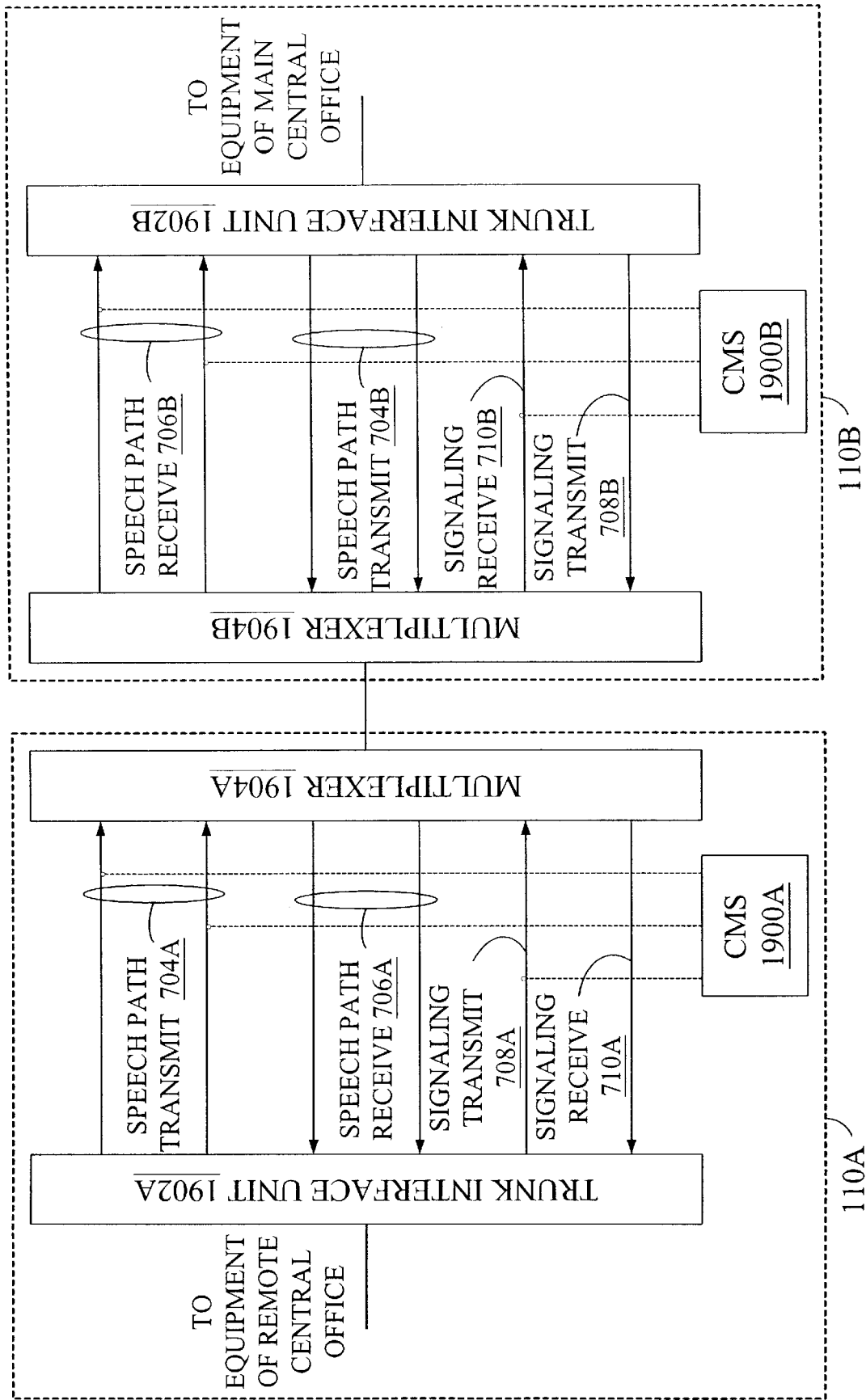
FIG. 19 depicts two example central office/trunk interface combined mode signaling devices connected within a remote central office and a main central office.

FIG. 19 depicts example CO-TR CMS devices 1900A and 1900B connected within remote central office 110A and main central office 110B, respectively. Both central offices 110 include a trunk interface unit (1902A and 1902B) and a multiplexer (1904A and 1904B).

In many countries where older central offices are still in service, the trunk lines between central offices (as well as between PBXs and central offices) communicate using a standard DP protocol. For example, DP signal protocols on trunk lines can have a speed of 10 pulses per second, or in some cases a speed of 20 pulses per second. The signals passed between trunk interface unit 1902 and multiplexer 1904 can vary from one central office to another. For older type central offices 110, in-band signaling is sometimes used where signaling information and speech are transmitted over common wires (e.g., the speech path). Signaling information can include, for example, control information related to the call. CO-TR CMS device 1900A can be implemented as described above with respect to local loop CMS device 600.

Other central offices 110 use out-band signaling where speech is transmitted over the speech path but signaling information is transmitted over separate signaling wires. FIG. 19 depicts an example of this type of signaling. Speech is exchanged over speech path transmit 704 and speech path receive 706, whereas signaling information is exchanged over signaling transmit 708 and signaling receive 710. CO-TR CMS device 1900B can be implemented as described above with respect to trunk CMS device 700.

According to an example embodiment of the present invention, CO-TR CMS device 1900B recognizes DP digits having one or more forms. For example, CO-TR CMS device 1900B recognizes pulses created at the outgoing trunk interface by breaking the loop current of the speech path, pulses created at the remote CO (or PBX) by applying a particular voltage polarity (usually DC) to the tip and ring wires of the speech path, and pulses created at the remote CO (or PBX) by applying a particular voltage polarity (usually DC) to one or more separate signaling wires.

Where IVR system 106 is connected to main central office 110B, the connection between callers from, for example, remote central office 110A are established in the direction of remote to main central office. The DP digits dialed by the caller are transmitted over signaling transmit 708A within remote central office 110A and received over signaling receive 710B within main central office 110B. CO-TR CMS device 1900A outputs DTMF signals corresponding to the recognized DP digits on speech path transmit 704A; these digits are received on speech path receive 706B. CO-TR CMS device 1900B outputs DTMF signals directly to speech path receive 706B.

A group of trunk lines commonly service all subscribers within any given remote central office, where the rate of subscribers per trunk can be, for example, approximately 10 to 1. As described above with respect to CO-SP CMS devices, significant savings can be realized by using CO-TR CMS devices. The number of devices required to provide CMS service is reduce by a factor of 10 or more as compared to those CMS devices that provide CMS service to a single subscriber. Also, multiple CO-TR CMS devices can be implemented on a single board, can be powered by the central office power supply, and are protected from power surges by main distribution frame 1202.

Further, locating CO-TR CMS devices within main central office 110B (such as CMS device 1900B) obviates the need for travel to remote central offices for installation and/or maintenance of the CMS devices. This can result in a significant savings in cost and manpower.

This concludes the description of the example embodiments. Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

For example, while the above example description includes different parallel and serial CMS devices, universal CMS devices are also contemplated wherein parallel and serial connections can be selected between on a single device.

Further, while the above example description includes several example embodiments wherein CMS devices are connected at various points within telephone network 104, those skilled in the art will recognize that CMS devices can be connected at other points throughout telephone network 104, necessitating only minor modifications to the CMS device to achieve similar results.

Comparison of CMS Devices

As described in the preceding sections, the starting point and duration of the CMS process depends upon the position of the CMS device within the telephone network. FIG. 21 depicts a table that compares whether the CMS signal is generated within the connection and/or interaction phases for caller-side and CO-side CMS devices. Column 2102 lists the class of CMS device (i.e., caller-side or CO-side), column 2104 lists the type of CMS device, column 2106 lists the direction of the call (i.e., from caller to IVR, or IVR to caller), and column 2108 lists whether the CMS signal is present during the connection and interaction phases for the devices described by each horizontal row. For example, caller-side, stand-alone CMS devices, where the direction of the call is IVR to caller, generate CMS signals during the interaction phase but not during the connection phase.

Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

The previous description of the preferred embodiments is provided to enable any person skilled in the art to make or use the present invention. While the invention has been particularly shown and described with reference to preferred embodiments thereof, it will be understood by those skilled in the art that various changes in form and details may be made therein without departing from the spirit and scope of the invention.

What is claimed is:

1. A system, comprising:
   a telephone network;
   a telephone network interface box coupled to said telephone network via a local loop;
   a telephone jack coupled to said telephone network interface box;
   a telephone coupled to said telephone jack; and
   a combined mode signaling device, coupled to said telephone jack, wherein said combined mode signaling device includes:
      a control device coupled to monitor DP pulses from said telephone without interfering with said DP pulses;
      a dial pulse counter to count said DP pulses until a dialed digit is recognized, and
      a DTMF transmitter to output a DTMF signal on said local loop following said recognized digit, wherein said DTMF signal corresponds to said dialed digit.

2. The system of claim 1, further comprising:

a second telephone jack coupled to said telephone network interface box; and a second telephone coupled to said second telephone jack, wherein said combined mode signaling device is coupled to said telephone jack in parallel, and wherein said control device is also coupled to monitor DP pulses from said second telephone.

3. A method, comprising:

monitoring dial pulse (DP) signals on a line to recognize a dialed digit during at least a portion of a connection phase and during at least a portion of an interaction phase, wherein said DP signals are generated by a transmission element and received by a reception element within a telephone network, and wherein said monitoring does not interfere with said DP signals;

sending said recognized dialed digit to a dual tone multi-frequency (DTMF) transmitter; and outputting on said line a DTMF signal following said DP signals, wherein said DTMF signal corresponds to said recognized dialed digit.

4. The method of claim 3, wherein said transmission element comprises a telephone and said reception element comprises a switch.

5. The method of claim 3, wherein said reception element comprises a component of a switch, and wherein said DP signals are monitored on a signaling line from said component.

6. The method of claim 3, wherein said transmission element comprises a first switch and said reception element comprises a second switch.

7. The method of claim 3, wherein said dialed digit is recognized upon detecting an inter-digit interval.

8. The method of claim 3, wherein said DP signals include one or more DP pulses, and wherein said monitoring DP signals comprises:

waiting until a connect signal is detected; and counting said DP pulses until an inter-digit interval is detected, wherein said dialed digit is equal to the DP pulse count.

9. The method of claim 8, wherein said connect signal comprises an off-hook condition.

10. The method of claim 8, wherein said connect signal comprises a seizing signal on a trunk line.

11. The method of claim 10, wherein said trunk line includes a signaling receive line, and wherein said seizing signal comprises a pulse transmitted over said signaling receive line.

12. The method of claim 3, wherein said DP signals are monitored continuously.

13. An apparatus, comprising:

a control device coupled to monitor DP pulses on a line during at least a portion of a connection phase and during at least a portion of an interaction phase, wherein said DP pulses are generated by a transmission element and received by a reception element within a telephone network, and wherein said control device does not interfere with said DP signals;

a dial pulse counter to count said DP pulses until a dialed digit is recognized; and a DTMF transmitter to output on said line a DTMF signal following said DP pulses, wherein said DTMF signal corresponds to said dialed digit.

14. The apparatus of claim 13, wherein said control device comprises a local loop control device, and wherein said line comprises a local loop.

15. The apparatus of claim 14, wherein said local loop control device monitors said local loop for an off-hook condition before receiving said DP pulses.

16. The apparatus of claim 13, wherein said control device comprises a signaling control device coupled to a trunk line.

17. The apparatus of claim 16, wherein said trunk line includes a signaling receive line, and wherein said signaling control device monitors said signaling receive line for a seizing signal before receiving said DP pulses.

18. The apparatus of claim 13, wherein said reception element comprises a component of a switch, and wherein said DP signals are monitored on a signaling line from said component.

19. The apparatus of claim 13, wherein said transmission element comprises a first switch and said reception element comprises a second switch.

20. An apparatus for allowing a caller using a DP telephone to access an IVR system connected to a central office within a telephone network, wherein the DP telephone is coupled to the telephone network via a local loop, and wherein the central office includes a speech path, a main distribution frame coupled to the speech path, a subscriber interface unit coupled to the speech path, a subscriber switching unit coupled to the speech path, an intermediate distribution frame coupled to the speech path, and a speech path interface unit coupled to the speech path, wherein the apparatus comprises:

a control device coupled to monitor DP pulses from the DP telephone during at least a portion of a connection phase and during at least a portion of an interaction phase without interfering with said DP pulses;

a dial pulse counter to count said DP pulses until a dialed digit is recognized; and a DTMF transmitter to output a DTMF signal on the speech path, wherein said DTMF signal corresponds to said dialed digit.

21. The apparatus of claim 20, wherein said control device is coupled to the speech path between the main distribution frame and the subscriber interface unit.

22. The apparatus of claim 20, wherein said control device is coupled to the speech path between the intermediate distribution frame and the speech path interface unit.

23. The apparatus of claim 20, wherein said control device is coupled to a signaling line from the speech path interface unit.

24. The apparatus of claim 23, wherein said signaling line comprises an electrical connection to a line battery power element.

25. An apparatus for allowing a caller using a DP telephone to access an IVR system via a telephone network, wherein the telephone network includes a remote switch coupled to the DP telephone via a local loop and a main switch coupled to the IVR system, and wherein the main switch is coupled to the remote switch via a trunk line, wherein said apparatus comprises:

a control device coupled to said trunk line to monitor DP pulses without interfering with said DP pulses;

a dial pulse counter to count said DP pulses until a dialed digit is recognized; and a DTMF transmitter to output a DTMF signal on said trunk line, wherein said DTMF signal corresponds to said dialed digit.

26. The apparatus of claim 25, wherein the remote switch comprises a remote central office, and wherein the main switch comprises a main central office.

* * * * *